(12) United States Patent
Chen et al.

(10) Patent No.: US 11,686,980 B2
(45) Date of Patent: Jun. 27, 2023

(54) DISPLAY PANEL HAVING SEALANT

(71) Applicant: Himax Display, Inc., Tainan (TW)

(72) Inventors: Ya-Jou Chen, Tainan (TW); Po-Hung Pan, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 17/133,653

(22) Filed: Dec. 24, 2020

(65) Prior Publication Data

US 2021/0116731 A1  Apr. 22, 2021

Related U.S. Application Data

(62) Division of application No. 16/398,272, filed on Apr. 30, 2019, now abandoned.

(51) Int. Cl.
*G02F 1/1339* (2006.01)
*G02F 1/1337* (2006.01)
*G02F 1/01* (2006.01)
*G02F 1/161* (2006.01)
*G02F 1/169* (2019.01)
*G02F 1/1679* (2019.01)

(52) U.S. Cl.
CPC .......... *G02F 1/1339* (2013.01); *G02F 1/0107* (2013.01); *G02F 1/1337* (2013.01); *G02F 1/161* (2013.01); *G02F 1/169* (2019.01); *G02F 1/1679* (2019.01)

(58) Field of Classification Search
CPC ...... G02F 1/1339; G02F 1/161; G02F 1/0107; G02F 1/1337
See application file for complete search history.

(56) References Cited

U.S. PATENT DOCUMENTS

| 2005/0206829 | A1* | 9/2005 | Hashimoto | G02F 1/1343 349/153 |
| 2009/0021681 | A1* | 1/2009 | Yun | G02F 1/1339 349/128 |
| 2009/0268145 | A1* | 10/2009 | Anjo | G02F 1/136209 349/147 |
| 2014/0319998 | A1* | 10/2014 | Han | H01L 51/5246 313/504 |
| 2015/0146147 | A1* | 5/2015 | Choi | G02F 1/1333 349/123 |

* cited by examiner

*Primary Examiner* — Lauren Nguyen
(74) *Attorney, Agent, or Firm* — JCIPRNET

(57) ABSTRACT

A display panel including a first substrate, a second substrate, a display medium layer and a sealant is provided. The second substrate is assembled with the first substrate. The display medium layer is disposed between the first substrate and the second substrate. The sealant is disposed between the first substrate and the second substrate, surrounds the display medium layer and includes a continuous one-piece pattern, wherein the continuous one-piece pattern includes a first segment and a second segment, and a difference between a width of the first segment and a width of the second segment is greater than or equal to a third of the width of the second segment.

7 Claims, 15 Drawing Sheets

DISPLAY PANEL HAVING SEALANT

CROSS-REFERENCE TO RELATED APPLICATION

This application is a divisional application of U.S. application Ser. No. 16/398,272, filed on Apr. 30, 2019, now pending. The entirety of the above-mentioned patent application is hereby incorporated by reference herein and made a part of specification.

BACKGROUND

Technical Field

The disclosure is related to an electronic device, and particularly to a display panel.

Description of Related Art

Liquid crystal display panels generally include a display medium layer sandwiched between two substrates that may serve as a liquid crystal cell. The two substrates are assembled by a sealant surrounding the display medium layer. The sealant is made of a curable material which is applied onto one of the two substrates during fabricating a liquid crystal panel. Thereafter, the other substrate is placed on the uncured material of the sealant and the material of the sealant is subsequently cured for assembling the two substrates.

SUMMARY

A display panel according to the embodiments of the disclosure employs the sealant with the pattern having good design window and the edge of pattern of the sealant has good linearity and sharpness.

According to the embodiments of the disclosure, a display panel including a first substrate, a second substrate, a display medium layer and a sealant is provided. The second substrate is assembled with the first substrate. The display medium layer is disposed between the first substrate and the second substrate. The sealant is disposed between the first substrate and the second substrate, surrounds the display medium layer and includes a continuous one-piece pattern, wherein the continuous one-piece pattern includes a first segment and a second segment, and a difference between a width of the first segment and a width of the second segment is greater than or equal to a third of the width of the second segment.

According to the embodiments of the disclosure, the sealant has an inner edge in contact with the display medium layer and an outer edge opposite to the inner edge, and the outer edge forms a recess indented towards the inner edge at the first segment.

According to the embodiments of the disclosure, a conductor is further disposed between the sealant and an edge of the first substrate, spaced apart from the sealant, and spanning a gap between the first substrate and the second substrate, wherein the conductor is located at least partially in the recess.

According to the embodiments of the disclosure, a shape of the sealant has a plurality of corners and the recess is disposed between two of the corners.

According to the embodiments of the disclosure, a shape of the sealant has a plurality of corners, and the recess is disposed at one of the corners.

According to the embodiments of the disclosure, the sealant has an inner edge in contact with the display medium layer and an outer edge opposite to the inner edge, and the inner edge at the first segment is not conformal to the outer edge at the first segment.

According to the embodiments of the disclosure, the outer edge at the first segment forms a chamfer.

According to the embodiments of the disclosure, the inner edge at the first segment forms a sharp angle.

According to the embodiments of the disclosure, a hydrophobic surface facing the display medium layer and disposed on the at least one of the first substrate and the second substrate is further included.

According to the embodiments of the disclosure, a sealant-contacting surface disposed on the at least one of the first substrate and the second substrate is further included, wherein the sealant extends within the sealant-contacting surface, and the hydrophobic surface comprises an inner portion and an outer portion sandwiching the sealant-contacting surface.

According to the embodiments of the disclosure, a display panel including a first substrate, a second substrate, a display medium layer, a hydrophobic surface, a sealant-contacting surface, and a sealant is provided. The second substrate is assembled with the first substrate. The display medium layer is disposed between the first substrate and the second substrate. The hydrophobic surface is disposed on at least one of the first substrate and the second substrate, facing the display medium layer. The sealant-contacting surface is disposed on the at least one of the first substrate and the second substrate, and is less hydrophobic than the hydrophobic surface, wherein the hydrophobic surface includes an inner portion and an outer portion sandwiching the sealant-contacting surface. The sealant is disposed between the first substrate and the second substrate, and extends within the sealant-contacting surface.

According to the embodiments of the disclosure, an alignment layer is further disposed on the at least one of the first substrate and the second substrate and surrounded by the sealant.

According to the embodiments of the disclosure, the alignment is spaced from the sealant by a gap, and the inner portion of the hydrophobic surface extends between the alignment layer and the sealant.

According to the embodiments of the disclosure, the alignment layer is made of an organic alignment material.

According to the embodiments of the disclosure, the alignment layer extends to be in contact with the sealant, and the alignment layer is subjected to a hydrophobic treatment to form the inner portion of the hydrophobic surface.

According to the embodiments of the disclosure, the alignment layer is made of an inorganic alignment material.

According to the embodiments of the disclosure, the alignment layer further extends to overlap the sealant.

According to the embodiments of the disclosure, an inorganic layer is further disposed between the sealant and the alignment layer, and a surface of the inorganic layer forms the sealant-contacting surface.

According to the embodiments of the disclosure, the alignment layer further extends to a region between an edge of the at least one of the first substrate and the second substrate and the sealant, and a surface of the alignment layer between the edge and the sealant forms the outer portion of the hydrophobic surface.

According to the embodiments of the disclosure, an inorganic layer is further disposed on the at least one of the first substrate and the second substrate, wherein a first portion of the inorganic layer overlaps the sealant and a second portion of the inorganic layer extends inward beyond an inner edge of the sealant, the first portion of the inorganic layer is less hydrophobic than the second portion of the inorganic layer, the first portion of the inorganic layer forms the sealant-contacting surface and the second portion of the inorganic layer forms the inner portion of the hydrophobic surface.

In view of the above, the display panel in accordance with some embodiment of the disclosure includes a sealant with flexible design window. For example, the sealant of the display panel has various widths in a continuous one-piece pattern. In addition, the display panel in accordance with some embodiments of the disclosure includes the hydrophobic surface surrounding the sealant contacting surface so that the outline of the sealant may be sharp with good linearity. Therefore, the shape of the sealant is accurately defined without an undesired deformation so that the yield rate of the display panel is improved and the possibility that the display quality of the display panel 200A being influenced by the undesired shape of the sealant is reduced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
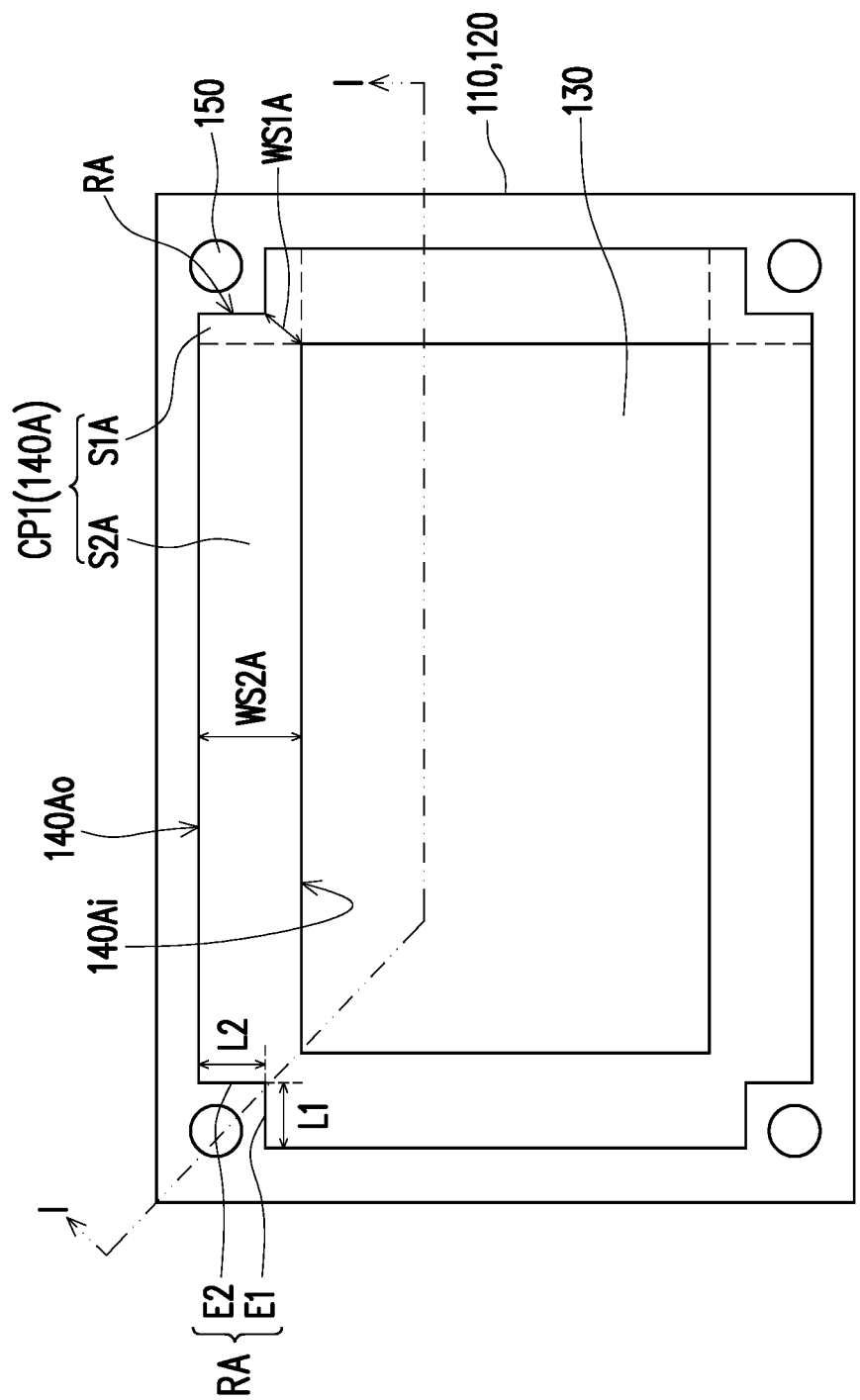
FIG. 1 schematically illustrates a top view of a display panel according to an embodiment of the disclosure.
Figure 2:
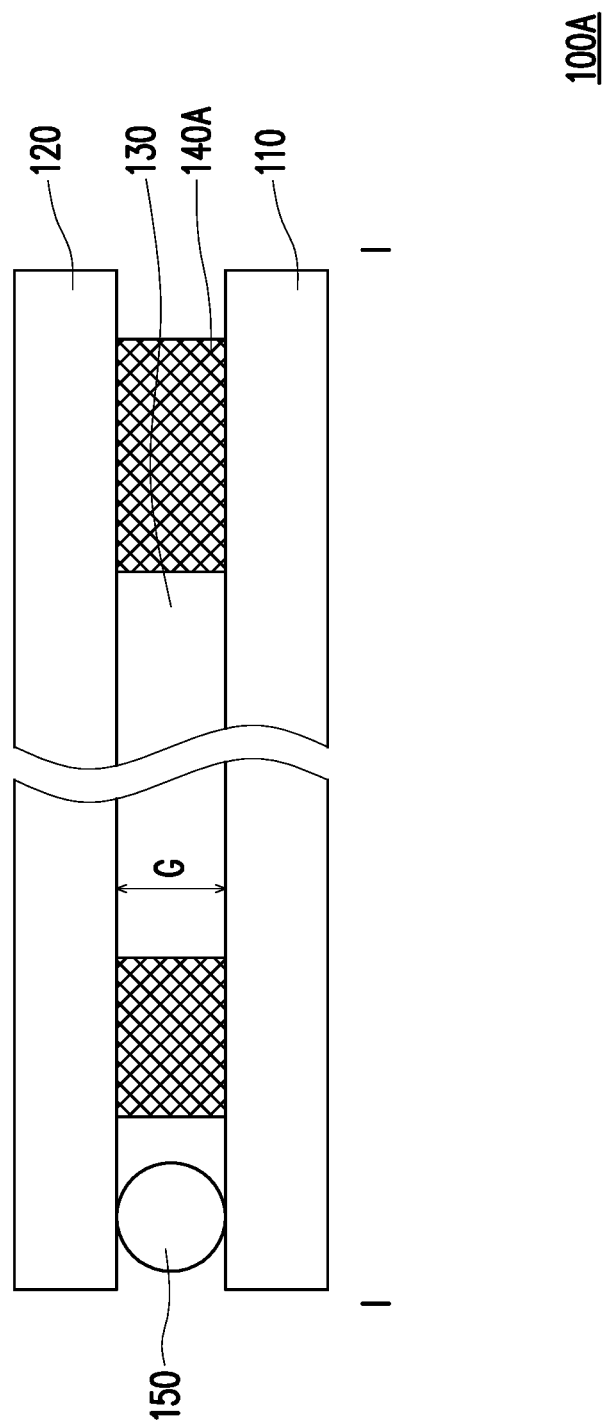
FIG. 2 schematically illustrates a cross sectional view of the display panel in FIG. 1, taken along line I-I.

FIG. 1 schematically illustrates a top view of a display panel according to an embodiment of the disclosure and FIG. 2 schematically illustrates a cross sectional view of the display panel in FIG. 1, taken along line I-I. Referring to FIG. 1 and FIG. 2, a display panel 100A mainly includes a first substrate 110, a second substrate 120, a display medium layer 130 and a sealant 140A. The first substrate 110 is assembled with the second substrate 120 by the sealant 140A while the sealant 140A spans a gap G between the first substrate 110 and the second substrate 120. The display medium layer 130 is disposed between the first substrate 110 and the second substrate 120 and surrounded by the sealant 140A. In the embodiment, the display panel 100A may further include a conductor 150 disposed between the sealant 140A and an edge of the first substrate 110, spaced apart from the sealant 140A, and spanning the gap G between the first substrate 110 and the second substrate 120. The number of the conductor 150 is four in FIG. 1. However, in an alternative embodiment, the conductor may be omitted or there may be more than four or less than four conductors 150 in the display panel 100A.

The first substrate 110 may be a transistor array substrate which includes a transistor array layer formed on a support plate. The support plate for the first substrate 110 may be a glass plate, a silicon backplane or the like. The transistor array may include a thin film transistor (TFT) array or a CMOS (Complementary Metal-Oxide Semiconductor) device array. The second substrate 120 may include a support plate and a conductive layer on the support plate. The support plate for the second substrate 120 may be glass, quartz, polymer substrate, or the like. A material of the conductive layer may be a transparent conductive material, such as metal oxides including indium tin oxide (ITO), aluminum zinc oxide (AZO) or indium zinc oxide (IZO). The transistor array layer on the first substrate 110 and the conductive layer on the second substrate 120 are used for generating a driving electric field for driving the display medium layer 130. However, in an alternative embodiment, the second substrate 120 may not include a conductive layer and/or may further include other film layers thereon, for example, an alignment layer, a patterned light shielding layer, a color filter layer, or the like.

The display medium layer 130 may include, for example, liquid crystal molecules which is able to be driving by the electric field generated by the transistor array of the first substrate 110 and the conductive layer of the second substrate 120 to display images. The display panel 100 may be a thin-film transistor liquid-crystal display (TFT-LCD) panel or an LCoS (liquid crystal on silicon) display panel. In some embodiments, the conductor 150 is used for electrically connecting the conductive component on the second substrate 120 to the conductive component on the first substrate 110. The conductor 150 may be made of nickel, or other conductive and solid metals and may be compressible so that the conductor 150 is not prone to damage the first substrate 110 or the second substrate 120. In an embodiment, the conductor 150 may be mixed with a material similar to the sealant 140A to have the compressible property.

The sealant 140A includes a continuous one-piece pattern CP1 as shown in FIG. 1A. In the embodiment, the sealant 140A entirely is a continuous one-piece pattern CP1 of a closed ring shaped, but the disclosure is not limited thereto. The sealant 140A has an inner edge 140Ai and an outer edge 140Ao. The inner edge 140Ai is in contact with the display medium layer 130 and the outer edge 140Ao is opposite to the inner edge 140Ai. The continuous one-piece pattern CP1 includes a first segment S1A having a width WS1A and a second segment S2A having a width WS2A different from the first segment S1A. In the embodiment, the width of each segment of the sealant 140A may be measured from a point at the inner edge 140Ai to a most adjacent point at the outer edge 140Ao.

In some embodiment, the continuous one-piece pattern CP1 of the sealant 140A is fabricated by an APR (flexographic) printing, an ink-jet printing and a screen printing. During the APR printing and the screen printing, a specific fixture or mask may be used for forming the specific pattern of the continuous one-piece pattern CP1, and thus the continuous one-piece pattern CP1 is formed integrally and there is no structure boundary between the first segment S1A and the second segment S2A. In the case the sealant 140A is formed by the ink-jet printing, a portion of the surface of the first substrate 110 and/or the second substrate 120 that surrounds a sealant region where the sealant 140A is predetermined to be located may be subjected to a hydrophobic treatment and the material of the sealant 140A is printed onto the sealant region via the ink-jet printing. Due to the hydrophobic property of the treated portion of the surface, the sealant 140A is formed to have a specific pattern defined by the treated portion of the surface. Accordingly, the pattern of the sealant 140A has a flexible design window and the widths of different segments in the continuous one-piece pattern are not identical. For example, in the embodiment, a difference between the width WS1A of the first segment S1A and the width WS2A of the second segment S2A may be greater than or equal to a third of the width WS2A of the second segment S2A.

In FIG. 1, the outer edge 140Ao forms a recess RA indented towards the inner edge 140Ai at the first segment S1A. In the embodiment, the shape of the sealant 140A has a plurality of corners, and the recess RA formed at the first segment S1A is disposed at one of the corners. Specifically, each of the corners of the sealant 140A is configured with the recess RA in the embodiment, but the disclosure is not limited thereto. The recess RA has two edge lines E1 and E2. The edge line E1 and the edge line E2 are intersected by an angle to form a tip at the bottom of the recess RA. The angle may be greater than 0 degree to 180 degrees, though FIG. 1 presents a substantial 90 degree angle as an example. The length L1 of the edge line E1 may be equal to or different from the length L2 of the edge line E1 and at least one of the length L1 and the length L2 may be greater than a third of the width WS2A of the second segment S2A. Specifically, the inner edge 140Ai may have a rectangle shape, but the outer edge 140Ao has a geometry shape different from the inner edge 140Ai, so that the inner edge 140Ai at the first segment S1A is not conformal to the outer edge 140Ao at the first segment S1A. Herein, the conductor 150 may be located at least partially in the recess RA so that the entire size of the display panel 100A may be reduced, but the disclosure is not limited thereto.

Figure 3:
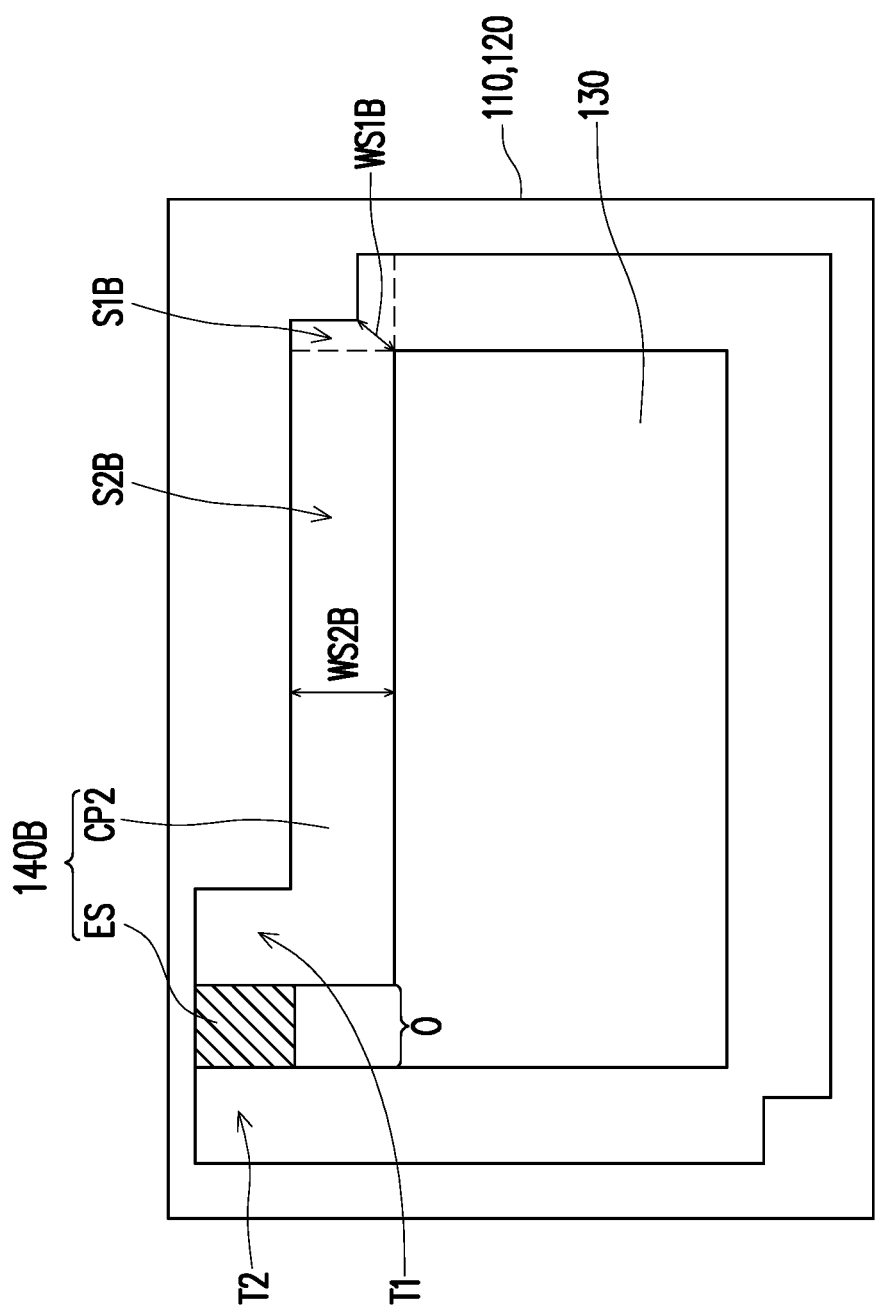
FIG. 3 schematically illustrates a top view of a display panel according to another embodiment of the disclosure.

FIG. 3 schematically illustrates a top view of a display panel according to another embodiment of the disclosure. In FIG. 3, the display panel 100B is similar to the display panel 100A in FIG. 1, but the structure of the sealant is different. Referring to FIG. 3, the display panel 100B includes a first substrate 110, a second substrate 120, a display medium layer 130 and a sealant 140B, wherein the first substrate 110, the second substrate 120, and the display medium layer 130 are substantially the same as those depicted in FIGS. 1 and 2 and the details thereof are not reiterated. In the display panel 100B, the sealant 140B includes a continuous one-piece pattern CP2 and an end seal ES. Specifically, the sealant 140B has two terminals T1 and T2 separated by a distance and the end seal ES is disposed to connect the two terminals T1 and T2 so that the continuous one-piece pattern CP2 and the end seal ES together forms a closed ring entirely surrounding the display medium layer 130. The end seal ES may be made of the same material of the continuous one-piece pattern CP2, but is not limited thereto.

In the display panel 100B, the continuous one-piece pattern CP2 has a first segment S1B and a second segment S2B, and a difference between the width WS1B of the first segment S1B and the width WS2B of the second segment S2B may be greater than or equal to a third of the width WS2B of the second segment S2B. Namely, the continuous one-piece pattern CP2 has a similar design as the continuous one-piece pattern CP1, except for the separate two terminals T1 and T2.

Figure 4:
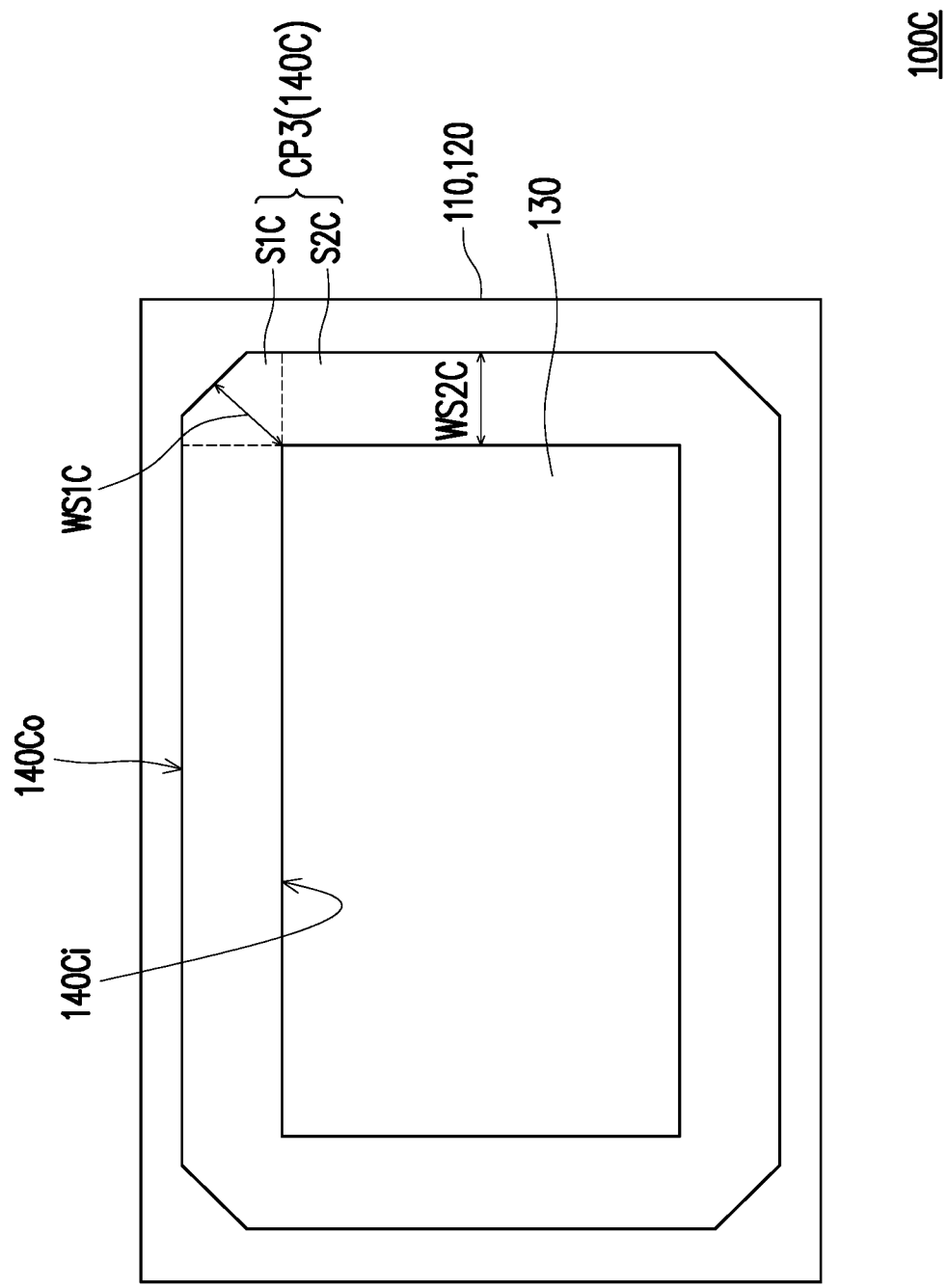
FIG. 4 schematically illustrates a top view of a display panel according to another embodiment of the disclosure.

FIG. 4 schematically illustrates a top view of a display panel according to another embodiment of the disclosure. In FIG. 4, the display panel 100C is similar to the display panel 100A in FIG. 1, but the structure of the sealant is different. Referring to FIG. 4, the display panel 100C includes a first substrate 110, a second substrate 120, a display medium layer 130, a sealant 140C and the conductor 150, wherein the first substrate 110, the second substrate 120, the display medium layer 130, and the conductor 150 are substantially the same as those depicted in FIGS. 1 and 2 and the details thereof are not reiterated. In the display panel 100C, the sealant 140C is made of the continuous one-piece pattern CP3 which forms a closed ring entirely surrounding the display medium layer 130. The continuous one-piece pattern CP3 includes a first segment S1C having a width WS1C and a second segment S2C having a width WS2C different from the first segment S1C. A difference between the width WS1C of the first segment S1C and the width WS2C of the second segment S2C may be greater than or equal to a third of the width WS2C of the second segment S2C.

The shape of the sealant 140C has a plurality of corners, and the first segment S1C is positioned at the corner of the sealant 140C in the embodiment. The continuous one-piece pattern CP3 has an inner edge 140Ci in contact with the display medium layer 130 and an outer edge 140Co opposite to the inner edge 140Ci, and the inner edge 140Ci at the first segment S1C is not conformal to the outer edge 140Co at the first segment S1C. In the embodiment, the outer edge 140Co at the first segment forms a chamfer and the inner edge 140Co at the first segment S1C forms a sharp angle, for example a right angle. The continuous one-piece pattern CP3 of the sealant 140C forms a closed ring, but is not limited thereto. In an alternative embodiment, the continuous one-piece pattern CP3 of the sealant 140C may not form a closed ring and have an opening similar to the continuous one-piece pattern CP2 depicted in FIG. 3. In such embodiment, the sealant 140C may further include an end seal as depicted in FIG. 3.

Figure 5:
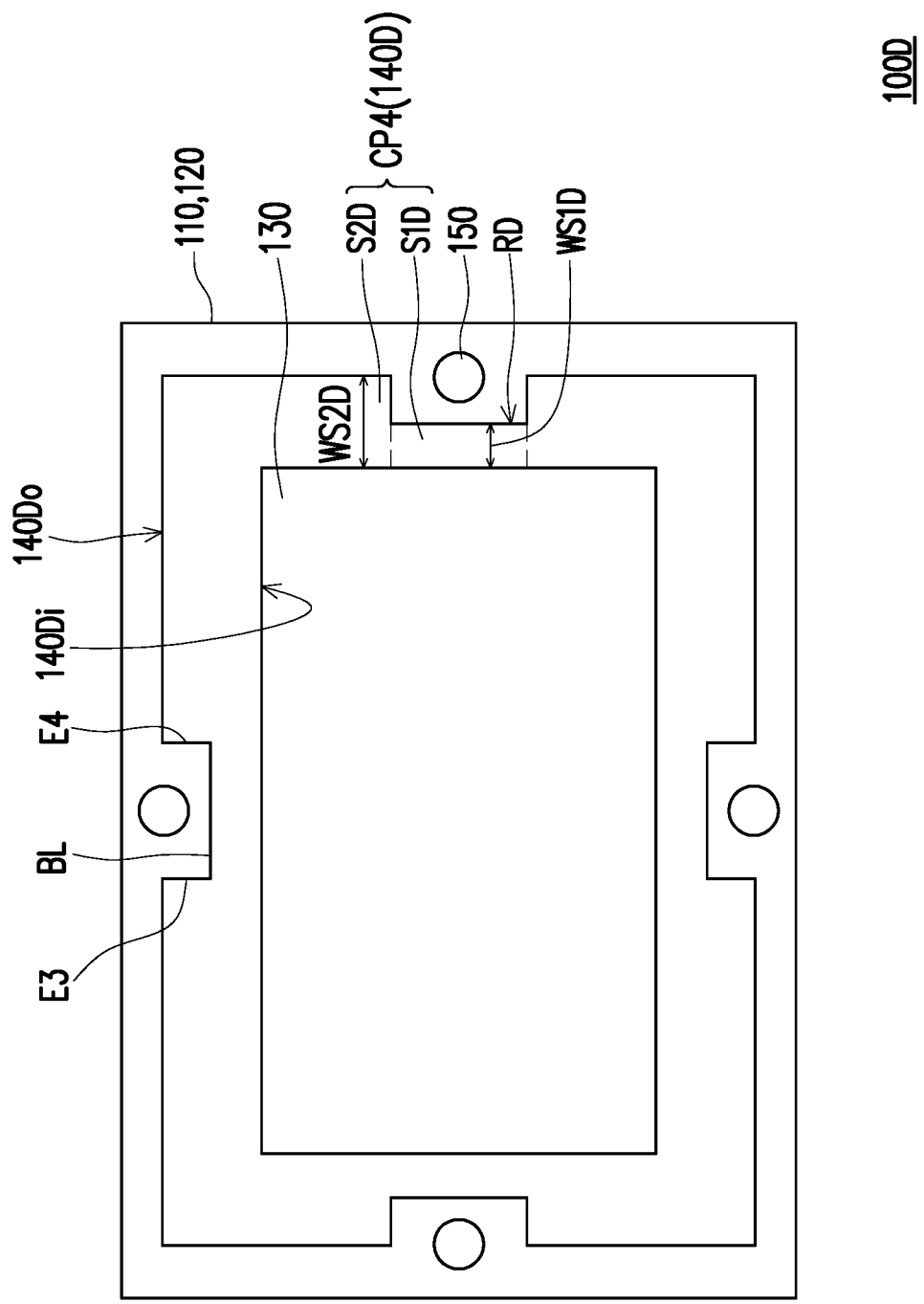
FIG. 5 schematically illustrates a top view of a display panel according to another embodiment of the disclosure.

FIG. 5 schematically illustrates a top view of a display panel according to another embodiment of the disclosure. In FIG. 5, the display panel 100D is similar to the display panel 100A in FIG. 1, but the structure of the sealant is different. Referring to FIG. 5, the display panel 100D includes a first substrate 110, a second substrate 120, a display medium layer 130, a sealant 140D and the conductor 150, wherein the first substrate 110, the second substrate 120, the display medium layer 130, and the conductor 150 are substantially the same as those depicted in FIGS. 1 and 2 and the details thereof are not reiterated. In the display panel 100D, the sealant 140D is made of the continuous one-piece pattern CP4 which forms a closed ring entirely surrounding the display medium layer 130. The continuous one-piece pattern CP4 has at least one first segment S1D and at least one second segment S2D, and a difference between the width WS1D of the first segment S1D and the width WS2D of the second segment S2D may be greater than or equal to a third of the width WS2D of the second segment S2D.

The sealant 140D has an inner edge 140Di in contact with the display medium layer 130 and an outer edge 140Do opposite to the inner edge 140Di. In the embodiment, the outer edge 140Do forms a recess RD indented towards the inner edge 140Di at the first segment S1D. A shape of the sealant 140D has a plurality of corners, for example four, and the recess RD is disposed between two of the corners. The recess RD substantially has a bottom line BL and edge lines E3 and E4, the bottom line BL may be substantially parallel to the inner edge 140Di of the sealant 140D at the first segment S1D, and the edge lines E3 and E4 are extends in a direction intersecting the bottom line BL. The edge lines E3 and E4 may intersect the bottom line at an angle in a range of greater than 0 degree to 180 degrees. The recess RD in the embodiment has a rectangular outline, but in an alternative embodiment, the recess RD may have a tapered outline, a curved outline or the like.

Figure 6:
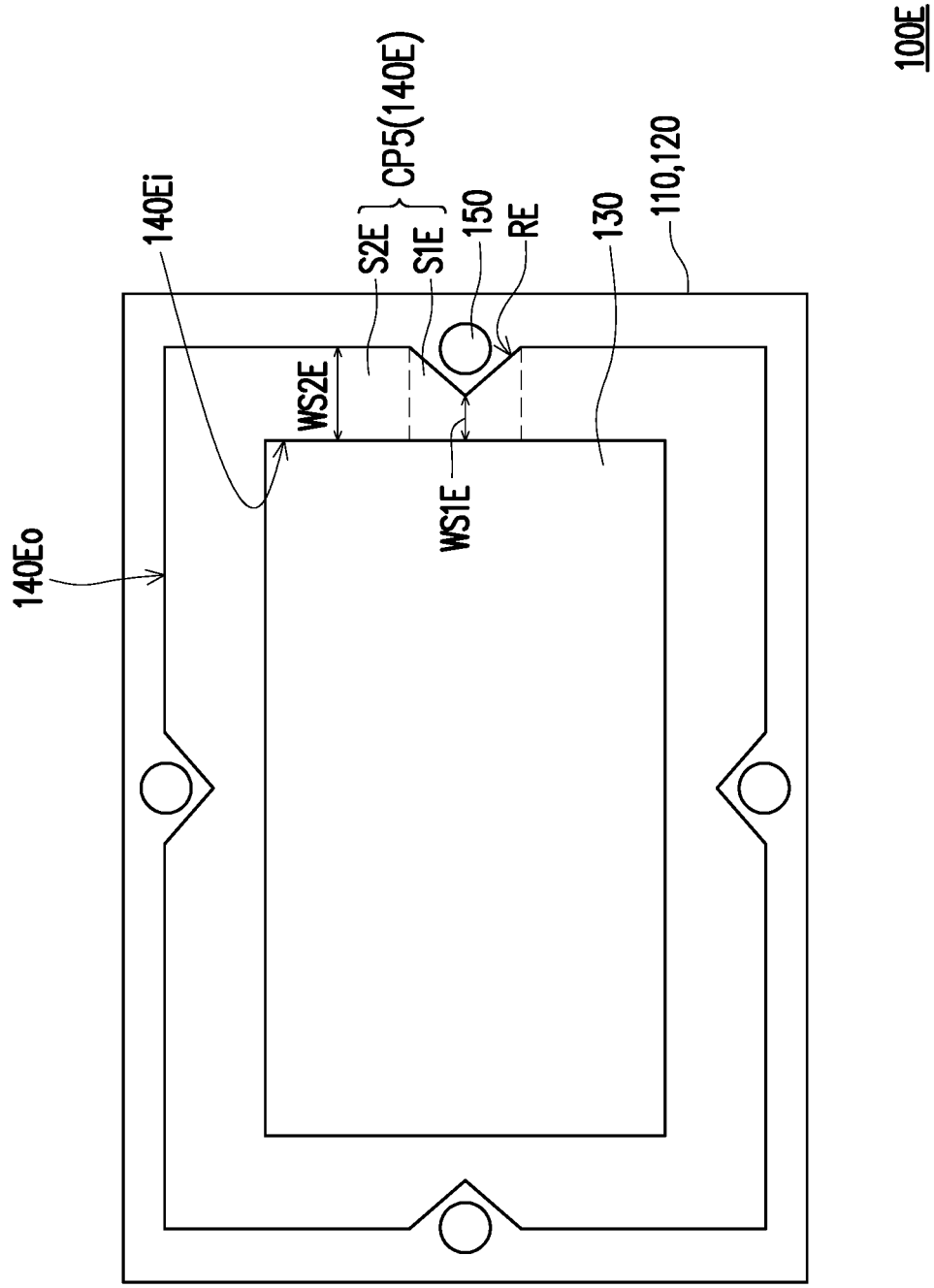
FIG. 6 schematically illustrates a top view of a display panel according to another embodiment of the disclosure.

FIG. 6 schematically illustrates a top view of a display panel according to another embodiment of the disclosure. In FIG. 6, the display panel 100E is similar to the display panel 100A in FIG. 1, but the structure of the sealant is different. Referring to FIG. 6, the display panel 100E includes a first substrate 110, a second substrate 120, a display medium layer 130, a sealant 140E and the conductor 150, wherein the first substrate 110, the second substrate 120, the display medium layer 130, and the conductor 150 are substantially the same as those depicted in FIGS. 1 and 2 and the details thereof are not reiterated. In the display panel 100E, the sealant 140E is made of the continuous one-piece pattern CP5 which forms a closed ring entirely surrounding the display medium layer 130. The continuous one-piece pattern CP5 has at least one first segment S1E and at least one second segment S2E, and a difference between the width WS1E of the first segment S1E and the width WS2E of the second segment S2E may be greater than or equal to a third of the width WS2E of the second segment S2E. The sealant 140E has an inner edge 140Ei in contact with the display medium layer 130 and an outer edge 140Eo opposite to the inner edge 140Ei. In the embodiment, the outer edge 140Do forms a recess RE indented towards the inner edge 140Ei at the first segment S1E. The disposition location of the recess RE is similar to the recess RD depicted in FIG. 5 and a difference between the two recesses is that the recess RE has a triangular outline. In other words, the bottom of the recess RE is a shape tip.

Figure 7:
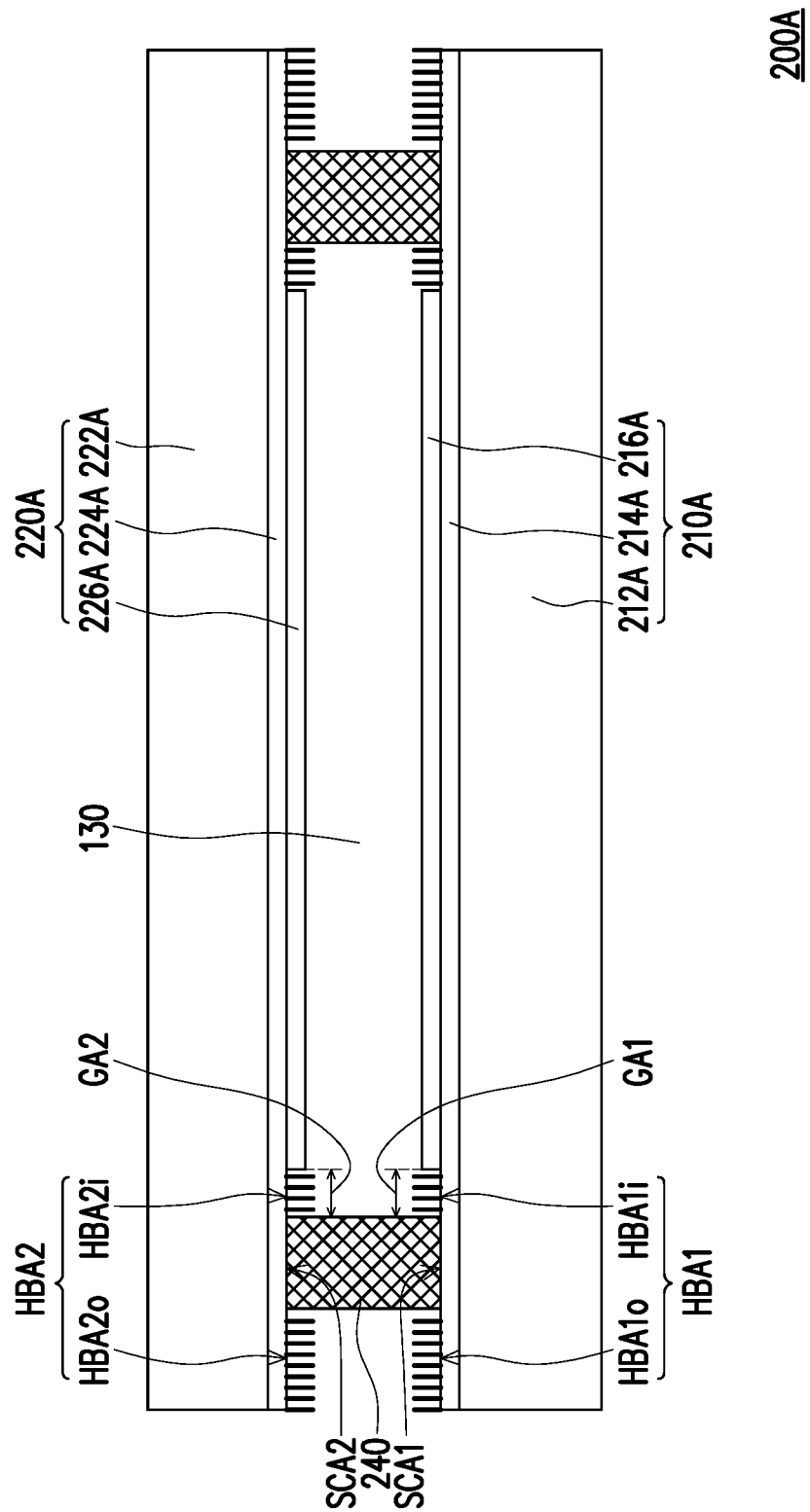
FIG. 7 schematically illustrates a cross sectional view of a display panel according to an embodiment of the disclosure.

FIG. 7 schematically illustrates a cross sectional view of a display panel according to an embodiment of the disclosure. Referring to FIG. 7, a display panel 200A mainly includes a first substrate 210A, a second substrate 220A, a display medium layer 130 and a sealant 240. The first substrate 210A and the second substrate 220A are assembled via the sealant 240, and the display medium layer 130 is disposed between the first substrate 210A and the second substrate 220A and surrounded by the sealant 240. Specifically, a hydrophobic surface HBA1 and a sealant-contacting surface SCA1 are formed on the first substrate 210A and face the display medium layer 130, and a hydrophobic surface HBA2 and a sealant-contacting surface SCA2 are formed on the second substrate 220A and face the display medium layer 130. In the embodiment, the sealant-contacting surface SCA1 on the first substrate 210A and the sealant-contacting surface SCA2 on the second substrate 220A are aligned with each other. The sealant-contacting surface SCA1 is less hydrophobic than the hydrophobic surface HBA1 and the sealant-contacting surface SCA2 is less hydrophobic than the hydrophobic surface HBA2. In some embodiments, the water contact angle of the hydrophobic surface HBA1 or HBA2 may be greater than 60 degrees. The hydrophobic surface HBA1 includes an inner portion HBA1i and an outer portion HBA1o sandwiching the sealant-contacting surface SCA1, and the hydrophobic surface HBA2 includes an inner portion HBA2i and an outer portion HBA2o sandwiching the sealant-contacting surface SCA2. Specifically, one end of the sealant 240 is in contact with the sealant-contacting surfaces SCA1 and is substantially demarked by the boundaries between the inner portion HBA1i and the sealant-contacting surface SCA1 and between the outer portion HBA1o and the sealant-contacting surface SCA1. The other end of the sealant 240 is in contact with the sealant-contacting surfaces SCA2 and is substantially demarked by the boundaries between the inner portion HBA2i and the sealant-contacting surface SCA2 and between the outer portion HBA2o and the sealant-contacting surface SCA2. In an alternative embodiment, one of the group of the hydrophobic surface HBA1 and the sealant-contacting surface SCA1 and the group of the hydrophobic surface HBA2 and the sealant-contacting surface SCA2 may be omitted.

The first substrate 210A may be a transistor array substrate which includes a support plate 212A, a transistor array layer 214A, and an alignment layer 216A. The support plate 212A for the first substrate 210A may be a glass plate, a silicon backplane or the like. The transistor array layer 214A is disposed on the support plate 212A and may include a thin film transistor (TFT) array or a CMOS (Complementary Metal-Oxide Semiconductor) device array. The alignment layer 216A may be made of an organic alignment material or an inorganic alignment material. In the present embodiment, the alignment layer 216A is spaced from the sealant 240 by a gap GA1. In the case the alignment layer 216A is made of an organic alignment material such as polyimide, the alignment layer 216A may be formed by a spin coating, a slit coating, an APR printing, or an ink-let printing. The organic alignment material may be formed on the entire surface of the support plate 212A and subsequently be patterned by a plasma etching or a UV etching to form the alignment layer 216A. Alternatively, the organic alignment material may be coated or printed on a portion of the surface of the support plate 212A while the other portion of the surface of the support plate 212A is shielded by a shadow mask during coating or printing the organic alignment material. In addition, the organic alignment material may be a curable material so that the organic alignment material may be cured after coated on the support plate 212A by a thermal curing, a photo curing (e.g. UV curing) or a combination thereof. In the case the alignment layer 216A is made of inorganic alignment material, the alignment layer 216A may be formed on the support plate 212A by thermal evaporation or sol-gel process. Specifically, the inorganic alignment material may include obliquely deposited silicon or nanostructured zinc oxide.

In the embodiment, an upper most film layer of the transistor array layer 214A may extend from the edge of the alignment layer 216A to an edge of the support plate 212A. The upper most film layer of the transistor array layer 214A may be an inorganic layer, and partially subjected to a hydrophobic treatment to define the hydrophobic surface HBA1 and the sealant-contacting surface SCA1. In some embodiments, the hydrophobic treatment may include a chemical vapor deposition (CVD) process for depositing a hydrophobic material such as long-chain silanes, acids, or long-chain alcohols on the treated surface.

Specifically, the hydrophobic treatment may be performed on the uppermost film layer of the transistor array layer 214A extending from the edge of the alignment layer 216A to an edge of the support plate 212A while the portion of the upper most film layer of the transistor array layer 216A that is predetermined to be in contact with the sealant 240 is shielded, such that a portion of the uppermost film layer of the transistor array layer 214A between the alignment layer 216A and the shielded portion and a portion of the upper uppermost film layer of the transistor array layer 214A between the shielded portion and the edge of the support plate 212A are more hydrophobic than the shielded portion to respectively form the inner portion HBA1$i$ and the outer portion HBA1$o$ of the hydrophobic surface HBA1, and the shielded portion forms the sealant-contacting surface SCA1. In an alternative embodiment, the uppermost film layer of the transistor array layer 214A extending from the edge of the alignment layer 216A to an edge of the support plate 212A may be entirely subjected to the hydrophobic treatment to form a continuous hydrophobic surface extending from the edge of the alignment layer 216A to an edge of the support plate 212A and a patterning process, such as a plasma or UV etching, is performed on the continuous hydrophobic surface to remove the hydrophobic material on the portion of the uppermost film layer of the transistor array layer 214A that is predetermined to be in contact with the sealant 240. As such, the sealant-contacting surface SCA1 sandwiched between the inner portion HBA1$i$ of the hydrophobic surface HBA1 and the outer portion HBA1$o$ of the hydrophobic surface HBA1 is formed.

The second substrate 220A may include a support plate 222A, a conductive layer 224A and an alignment layer 226A. The support plate 222A for the second substrate 120 may be glass, quartz, polymer substrate, or the like. A material of the conductive layer 224A may be a transparent conductive material, such as metal oxides including indium tin oxide (ITO), aluminum zinc oxide (AZO) or indium zinc oxide (IZO). The alignment layer 226A may be made of an organic alignment material or an inorganic alignment material. In the present embodiment, the alignment layer 226A is spaced from the sealant 240 by a gap GA2. The material and the formation of the alignment layer 226A may refer to those of the alignment layer 216A and are not reiterated here.

In the embodiment, the conductive layer 224A may extend from the edge of the alignment layer 226A to an edge of the support plate 222A. The conductive layer 224A may be partially subjected to a hydrophobic treatment to define the hydrophobic surface HBA2 and the sealant-contacting surface SCA2. In some embodiments, the hydrophobic treatment may include a chemical vapor deposition (CVD) process for depositing a hydrophobic material such as long-chain silanes, acids, or long-chain alcohols on the treated surface. Specifically, the hydrophobic treatment may be performed on the conductive layer 224A extending from the edge of the alignment layer 226A to the edge of the support plate 222A while the portion of the conductive layer 224A that is predetermined to be in contact with the sealant 240 is shielded, such that a portion of the conductive layer 224A between the alignment layer 226A and the shielded portion and a portion of the conductive layer 224A between the shielded portion and the edge of the support plate 212A are more hydrophobic than the shielded portion to respectively form the inner portion HBA2$i$ and the outer portion HBA2$o$ of the hydrophobic surface HBA2, and the shielded portion forms the sealant-contacting surface SCA2. In an alternative embodiment, the conductive layer 224A extending from the edge of the alignment layer 226A to an edge of the support plate 222A may be entirely subjected to the hydrophobic treatment to form a continuous hydrophobic surface extending from the edge of the alignment layer 226A to an edge of the support plate 222A and a patterning process, such as a plasma or UV etching, is performed on the continuous hydrophobic surface to remove the hydrophobic material on the portion of the conductive layer 224A that is predetermined to be in contact with the sealant 240. As such, the sealant-contacting surface SCA2 sandwiched between the inner portion HBA2$i$ of the hydrophobic surface HBA2 and the outer portion HBA2$o$ of the hydrophobic surface HBA2 is formed.

The sealant 240 may be formed on one of the first substrate 210A and the second substrate 220A by an ink-jet printing process and subsequently, the other of the first substrate 210A and the second substrate 220A is attached to the sealant 240 so that the first substrate 210A and the second substrate 220A are assembled. During the ink-jet printing process, the ink drops of the sealant material are printed on the sealant-contacting surface SCA1 or SCA2. Owing that the sealant-contacting surface SCA1 or SCA2 is less hydrophobic than the inner portion HBA1$i$ or HBA2$i$ and the outer portion HBA1$o$ or HBA2$o$, the ink drops are restricted within the sealant-contacting surface SCA1 or SCA2. As such, the ink drops would not spread out of the boundary between the sealant-contacting surface SCA1 or SCA2 and the hydrophobic surface HBA1 or HBA2, and the sealant 240 formed by curing the ink drops would have a shape that is defined by the boundary between the sealant-contacting surface SCA1 or SCA2 and the hydrophobic surface HBA1 or HBA2. Therefore, the shape of the sealant 240 may have a specific geometry based on the boundary between the sealant-contacting surface SCA1 or SCA2 and the hydrophobic surface HBA1 or HBA2 and have a sharp edge with good linearity. For example, the sealant 240 may have the shape shown in any of the sealants 140A to 140E and their alternatives described in above. Accordingly, the shape of the sealant 240 is accurately defined without an undesired deformation so that the yield rate of the display panel 200A is improved and the possibility that the display quality of the display panel 200A being influenced by the undesired shape of the sealant is reduced.

Figure 8:
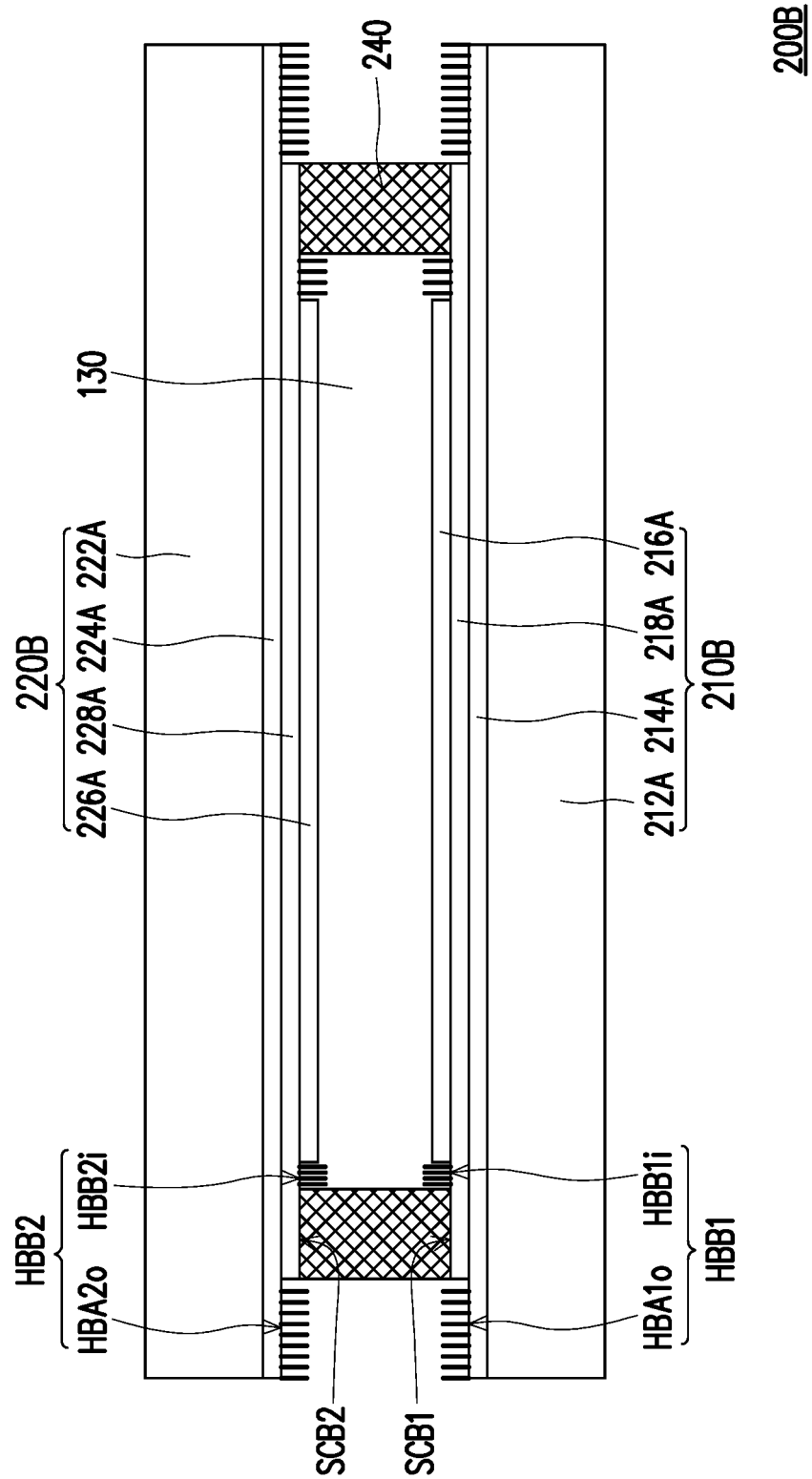
FIG. 8 schematically illustrates a cross sectional view of a display panel according to an embodiment of the disclosure.

FIG. 8 schematically illustrates a cross sectional view of a display panel according to an embodiment of the disclosure. Referring to FIG. 8, a display panel 200B mainly includes a first substrate 210B, a second substrate 220B, a display medium layer 130 and a sealant 240. The first substrate 210B and the second substrate 220B are assembled via the sealant 240, and the display medium layer 130 is disposed between the first substrate 210B and the second substrate 220B and surrounded by the sealant 240. Specifically, a hydrophobic surface HBB1 and a sealant-contacting surface SCB1 are formed on the first substrate 210B and face the display medium layer 130, and a hydrophobic surface HBB2 and a sealant-contacting surface SCB2 are formed on the second substrate 220B and face the display medium layer 130. In the embodiment, the sealant-contacting surface SCB1 on the first substrate 210B and the sealant-contacting surface SCB2 on the second substrate 220B are aligned with each other. The sealant-contacting surface SCB1 is less hydrophobic than the hydrophobic surface HBB1 and the sealant-contacting surface SCB2 is less hydrophobic than the hydrophobic surface HBB2. The hydrophobic surface HBB1 includes an inner portion HBB1*i* and an outer portion HBA1*o* sandwiching the sealant-contacting surface SCB1, and the hydrophobic surface HBB2 includes an inner portion HBB2*i* and an outer portion HBA2*o* sandwiching the sealant-contacting surface SCB2. Specifically, one end of the sealant 240 is in contact with the sealant-contacting surfaces SCB1 and is substantially demarked by the boundaries between the inner portion HBB1*i* and the sealant-contacting surface SCB1 and between the outer portion HBA1*o* and the sealant-contacting surface SCB1. The other end of the sealant 240 is in contact with the sealant-contacting surfaces SCB2 and is substantially demarked by the boundaries between the inner portion HBB2*i* and the sealant-contacting surface SCB2 and between the outer portion HBA2*o* and the sealant-contacting surface SCB2. In an alternative embodiment, one of the group of the hydrophobic surface HBB1 and the sealant-contacting surface SCB1 and the group of the hydrophobic surface HBB2 and the sealant-contacting surface SCB2 may be omitted.

The first substrate 210B, similar to the first substrate 210A in FIG. 7, includes a support plate 212A, a transistor array layer 214A, and an alignment layer 216A and further includes an inorganic layer 218A. The structure and the material of the support plate 212A, the transistor array layer 214A and the alignment layer 216A may refer to the above descriptions and are not reiterated here. In the present embodiment, the inorganic layer 218A is disposed between the alignment layer 216A and the transistor array layer 214A and a first portion of the inorganic layer 218A extends to overlap the sealant 240. In addition, a second portion of the inorganic layer 218A extends inward beyond an inner edge of the sealant 240 and at least between the alignment layer 216A and the sealant 240. The second portion of the inorganic layer 218A is subjected to a hydrophobic treatment and the first portion of the inorganic layer 218A is less hydrophobic than the second portion of the inorganic layer 218A. As such, the first portion of the inorganic layer 218A overlapping the sealant 240 forms the sealant-contacting surface SCB1 and the second portion of the inorganic layer 218A between the alignment layer 216A and the sealant 240 forms the inner portion HBB1*i* of the hydrophobic surface HBB1. In addition, in the present embodiment, the uppermost film layer of the transistor array layer 214A has a portion extending between the sealant 240 and the edge of the support plate 212A, similar to that depicted in FIG. 7, that forms the outer portion HBA1*o*.

The second substrate 220B, similar to the second substrate 220A in FIG. 7, includes a support plate 222A, a conductive layer 224A, and an alignment layer 226A and further includes an inorganic layer 228A. The structure and the material of the support plate 222A, the conductive layer 224A and the alignment layer 226A may refer to the above descriptions and are not reiterated here. In the present embodiment, the inorganic layer 228A is disposed between the alignment layer 226A and the conductive layer 224A and extends to overlap the sealant 240. In addition, a portion of the inorganic layer 228A extends between the alignment layer 226A and the sealant 240 is subjected to a hydrophobic treatment so that the portion of the inorganic layer 228A between the alignment layer 226A and the sealant 240 is more hydrophobic than the portion of the inorganic layer 228A overlapping the sealant 240. As such, the portion of the inorganic layer 228A between the alignment layer 226A and the sealant 240 forms the inner portion HBB2*i* of the hydrophobic surface HBB2 and the portion of the inorganic layer 228A overlapping the sealant 240 forms the sealant-contacting surface SCB2. In addition, in the present embodiment, the conductive layer 224A, similar to that depicted in FIG. 7, has a portion extending between the sealant 240 and the edge of the support plate 222A which forms the outer portion HBA2*o* of the hydrophobic layer HBA2.

The sealant 240 may be formed on one of the first substrate 210B and the second substrate 220B by an ink-jet printing process. During the ink-jet printing process, the ink drops of the sealant material are printed on the sealant-contacting surface SCB1 or SCB2. Owing that the sealant-contacting surface SCB1 or SCB2 is less hydrophobic than the inner portion HBB1*i* or HBB2*i* and the outer portion HBA1*o* or HBA2*o*, the ink drops of the sealant material are restricted within the sealant-contacting surface SCB1 or SCB2. As such, the ink drops would not spread out of the boundary between the sealant-contacting surface SCB1 or SCB2 and the hydrophobic surface HBB1 or HBB2 and the sealant 240 formed by curing the ink drops would have a shape that is defined by the boundary between the sealant-contacting surface SCB1 or SCB2 and the hydrophobic surface HBB1 or HBB2. Therefore, the shape of the sealant 240 may have a specific geometry based on the design and have a sharp edge with good linearity. For example, the sealant 240 may have the shape shown in any of the sealants 140A to 140E and their alternatives described in above.

Figure 9:
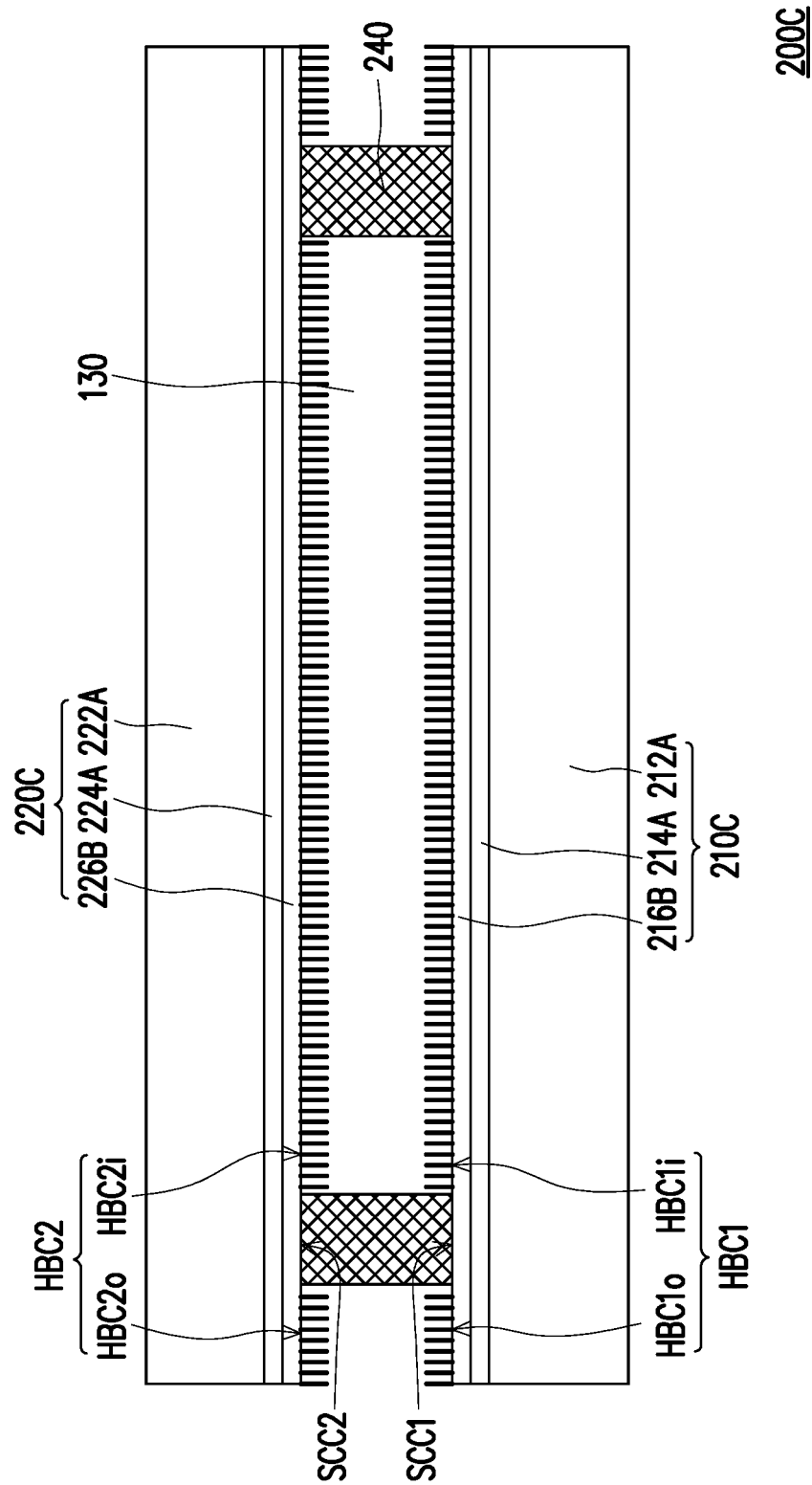
FIG. 9 schematically illustrates a cross sectional view of a display panel according to an embodiment of the disclosure.

FIG. 9 schematically illustrates a cross sectional view of a display panel according to an embodiment of the disclosure. Referring to FIG. 9, a display panel 200C mainly includes a first substrate 210C, a second substrate 220C, a display medium layer 130 and a sealant 240. The first substrate 210C and the second substrate 220C are assembled via the sealant 240, and the display medium layer 130 is disposed between the first substrate 210C and the second substrate 220C and surrounded by the sealant 240. Specifically, a hydrophobic surface HBC1 and a sealant-contacting surface SCC1 are formed on the first substrate 210C and face the display medium layer 130, and a hydrophobic surface HBC2 and a sealant-contacting surface SCC2 are formed on the second substrate 220C and face the display medium layer 130. In the embodiment, the sealant-contacting surface SCC1 on the first substrate 210C and the sealant-contacting surface SCC2 on the second substrate 220C are aligned with each other. The sealant-contacting surface SCC1 is less hydrophobic than the hydrophobic surface HBC1 and the sealant-contacting surface SCC2 is less hydrophobic than the hydrophobic surface HBC2. In some embodiments, the hydrophobic surface HBC1 or HBC2 may have a water contact angle greater than 60 degrees. The hydrophobic surface HBC1 includes an inner portion HBC1*i* and an outer portion HBC1*o* sandwiching the sealant-contacting surface SCC1, and the hydrophobic surface HBC2 includes an inner portion HBC2*i* and an outer portion HBC2*o* sandwiching the sealant-contacting surface SCC2. Specifically, one end of the sealant 240 is in contact with the sealant-contacting surfaces SCC1 and is substantially demarked by the boundaries between the inner portion HBC1*i* and the sealant-contacting surface SCC1 and between the outer portion HBC1*o* and the sealant-contacting surface SCC1. The other end of the sealant 240 is in contact with the sealant-contacting surfaces SCC2 and is substantially demarked by the boundaries between the inner portion HBC2$i$ and the sealant-contacting surface SCC2 and between the outer portion HBC2$o$ and the sealant-contacting surface SCC2. In an alternative embodiment, one of the group of the hydrophobic surface HBC1 and the sealant-contacting surface SCC1 and the group of the hydrophobic surface HBC2 and the sealant-contacting surface SCC2 may be omitted.

The first substrate 210C, similar to the first substrate 210A in FIG. 7, includes a support plate 212A, a transistor array layer 214A, and an alignment layer 216B. The structure and the material of the support plate 212A and the transistor array layer 214A may refer to the above descriptions and are not reiterated here. In the embodiment, the alignment layer 216B is an inorganic alignment layer and extends to overlap the sealant 240. Specifically, the alignment layer 216B extends on the entire surface of the first substrate 210C. The alignment layer 216B may be formed by a thermal evaporation process or a sol-gel process. The material of the alignment 216B may include silicon oxide or zinc oxide. In some embodiments, the alignment layer 216B may be formed of obliquely deposited silicon oxide or nanostructured zinc oxide. The alignment layer 216B may be partially subjected to a hydrophobic treatment so as to define the hydrophobic surface HBC1 and the sealant-contacting surface SCC1.

In the embodiment, most portions of the alignment 216A except for the portion that is predetermined to be in contact with the sealant 240 are functionalized with the hydrophobic property. Specifically, an entire of the portion of the alignment layer 216A surrounded by the sealant 240 are functionalized with the hydrophobic property. In some embodiments, the alignment layer 216A is entirely subjected to the hydrophobic treatment such that the hydrophobic material extends all over the surface of the intermediate product of the alignment layer 216A and a patterning process is latter performed to remove the hydrophobic material on the portion of the alignment layer 216A that is predetermined to be in contact with the sealant 240. In some alternative embodiments, the process of hydrophobic treatment is performed on the alignment layer 216B while the portion of the alignment layer 216A that is predetermined to be in contact with the sealant 240 is shielded so that the shielded portion is not subjected to the hydrophobic treatment and forms the sealant-contacting surface SCC1.

The second substrate 220C, similar to the second substrate 220A in FIG. 7, includes a support plate 222A, a conductive layer 224A and an alignment layer 226B. The structure and the material of the support plate 222A and the conductive layer 224A may refer to the above descriptions and are not reiterated here. In the embodiment, the alignment layer 226B is an inorganic alignment layer and extends to overlap the sealant 240. Specifically, the alignment layer 226B extends on the entire surface of the second substrate 220C. The alignment layer 226B may be formed by a thermal evaporation process or a sol-gel process. The material of the alignment 226B may include silicon oxide or zinc oxide. In some embodiments, the alignment layer 226B may be formed of obliquely deposited silicon oxide or nanostructured zinc oxide. The alignment layer 226B may be partially subjected to a hydrophobic treatment so as to define the hydrophobic surface HBC2 and the sealant-contacting surface SCC2.

In the embodiment, most portions of the alignment 226A except for the portion that is predetermined to be in contact with the sealant 240 are functionalized with the hydrophobic property. Specifically, an entire of the portion of the alignment layer 226A surrounded by the sealant 240 are functionalized with the hydrophobic property. In some embodiments, the alignment layer 226A is entirely subjected to the hydrophobic treatment such that the hydrophobic material extends all over the surface of the intermediate product of the alignment layer 226A and a patterning process is latter performed to remove the hydrophobic material on the portion of the alignment layer 226A that is predetermined to be in contact with the sealant 240. In some alternative embodiments, the process of hydrophobic treatment is performed on the alignment layer 226B while the portion of the alignment layer 226A that is predetermined to be in contact with the sealant 240 is shielded so that the shielded portion is not subjected to the hydrophobic treatment and forms the sealant-contacting surface SCC2.

The sealant 240 may be formed on one of the first substrate 210C and the second substrate 220C by an ink-jet printing process. During the ink-jet printing process, the ink drops of the sealant material are printed on the sealant-contacting surface SCC1 or SCC2. Owing that the sealant-contacting surface SCC1 or SCC2 is less hydrophobic than the inner portion HBC1$i$ or HBC2$i$ and the outer portion HBC1$o$ or HBC2$o$, the ink drops of the sealant material are restricted within the sealant-contacting surface SCC1 or SCC2. As such, the sealant 240 formed by curing the ink drops has a shape that is defined by the boundary between the sealant-contacting surface SCC1 or SCC2 and the hydrophobic surface HBC1 or HBC2. Therefore, the shape of the sealant 240 may have the specific geometry based on the boundary between the sealant-contacting surface SCC1 or SCC2 and the hydrophobic surface HBC1 or HBC2 and have a sharp edge with good linearity. For example, the sealant 240 may have the shape shown in any of the sealants 140A to 140E and their alternatives described in above.

Figure 10:
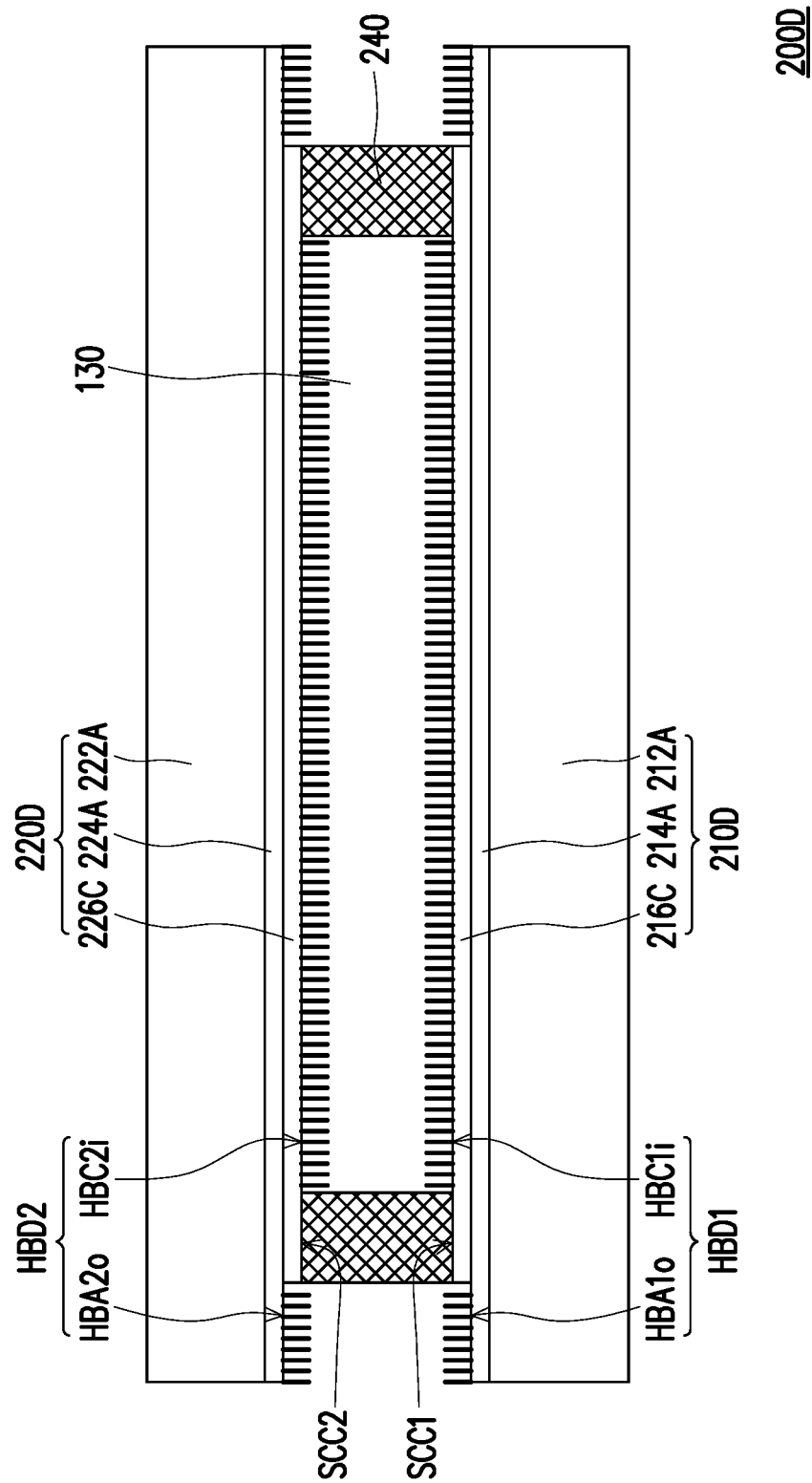
FIG. 10 schematically illustrates a cross sectional view of a display panel according to an embodiment of the disclosure.

FIG. 10 schematically illustrates a cross sectional view of a display panel according to an embodiment of the disclosure. Referring to FIG. 10, a display panel 200D mainly includes a first substrate 210D, a second substrate 220D, a display medium layer 130 and a sealant 240. The display panel 200D is similar to the display panel 200C depicted in FIG. 9 and a difference between the two embodiments includes the structures of the first substrate 210D and the second substrate 220D. Therefore, the same or similar components in the two embodiments are indicated by the same or similar reference numbers and the details of these components in the embodiment may refer to the embodiment depicted in FIG. 9. In the present embodiment, a hydrophobic surface HBD1 and a sealant-contacting surface SCC1 is formed on the first substrate 210D and a hydrophobic surface HBD2 and a sealant-contacting surface SCC2 is formed on the second substrate 220D.

In the embodiment, the first substrate 210D includes a support plate 212A, a transistor array layer 214A and an alignment layer 216C, wherein the disposition relationship and the structure of the support plate 212A and the transistor array layer 214A may refer to the above descriptions and are not reiterated here. The alignment layer 216C, similar to the alignment layer 216B in FIG. 9 is an inorganic alignment layer, but the alignment layer 216C does not extends to the region between the sealant 240 and the edge of the support plate 212A. In the embodiment, a portion of the alignment layer 216C overlaps the sealant 240 and the other portion of the alignment layer 216C extends thoroughly in the region surrounded by the sealant 240 without overlapping the sealant 240. The portion of the alignment layer 216C overlapping the sealant 240 is less hydrophobic than the portion of the alignment layer 216C not overlapping the sealant 240 to respectively define the sealant-contacting surface SCC1 and an inner portion HBC1$i$ of the hydrophobic surface HBD1. In addition, a portion of the uppermost film layer of the transistor array layer 214A extending between the sealant 240 and the edge of the support plate 212A is more hydrophobic than the sealant-contacting surface SCC1 to define an outer portion HBA1$o$ of the hydrophobic surface HBD1.

The second substrate 220D includes a support plate 222A, a conductive layer 224A and an alignment layer 226C, wherein the disposition relationship and the structure of the support plate 222A and the conductive layer 224A may refer to the above descriptions and are not reiterated here. The alignment layer 226C, similar to the alignment layer 226B in FIG. 9 is an inorganic alignment layer, but the alignment layer 226C does not extends to the region between the sealant 240 and the edge of the support plate 222A. In the present embodiment, the conductive layer 224A is exposed at the region between the sealant 240 and the edge of the support plate 222A. A portion of the alignment layer 226C overlaps the sealant 240 and the other portion of the alignment layer 226C extends thoroughly in the region surrounded by the sealant 240 without overlapping the sealant 240. The portion of the alignment layer 226C overlapping the sealant 240 is less hydrophobic than the portion of the alignment layer 226C not overlapping the sealant 240 to respectively define the sealant-contacting surface SCC2 and an inner portion HBC2$i$ of the hydrophobic surface HBD1. In addition, a portion of the conductive layer 224A extending between the sealant 240 and the edge of the support plate 222A is more hydrophobic than the sealant-contacting surface SCC2 to define an outer portion HBA2$o$ of the hydrophobic surface HBD1.

The hydrophobic surfaces HBD1 and HBD2 and the sealant-contacting surfaces SCC1 and SCC2 provide similar function as the above hydrophobic surfaces and the sealant-contacting surfaces in FIGS. 7 to 9. Accordingly, the shape of the sealant 240 may have the specific geometry based on the boundaries between the hydrophobic surfaces HBD1 and HBD2 and the sealant-contacting surfaces SCC1 and SCC2 and have a sharp edge with good linearity. For example, the sealant 240 may have the shape shown in any of the sealants 140A to 140E and their alternatives described in above.

Figure 11:
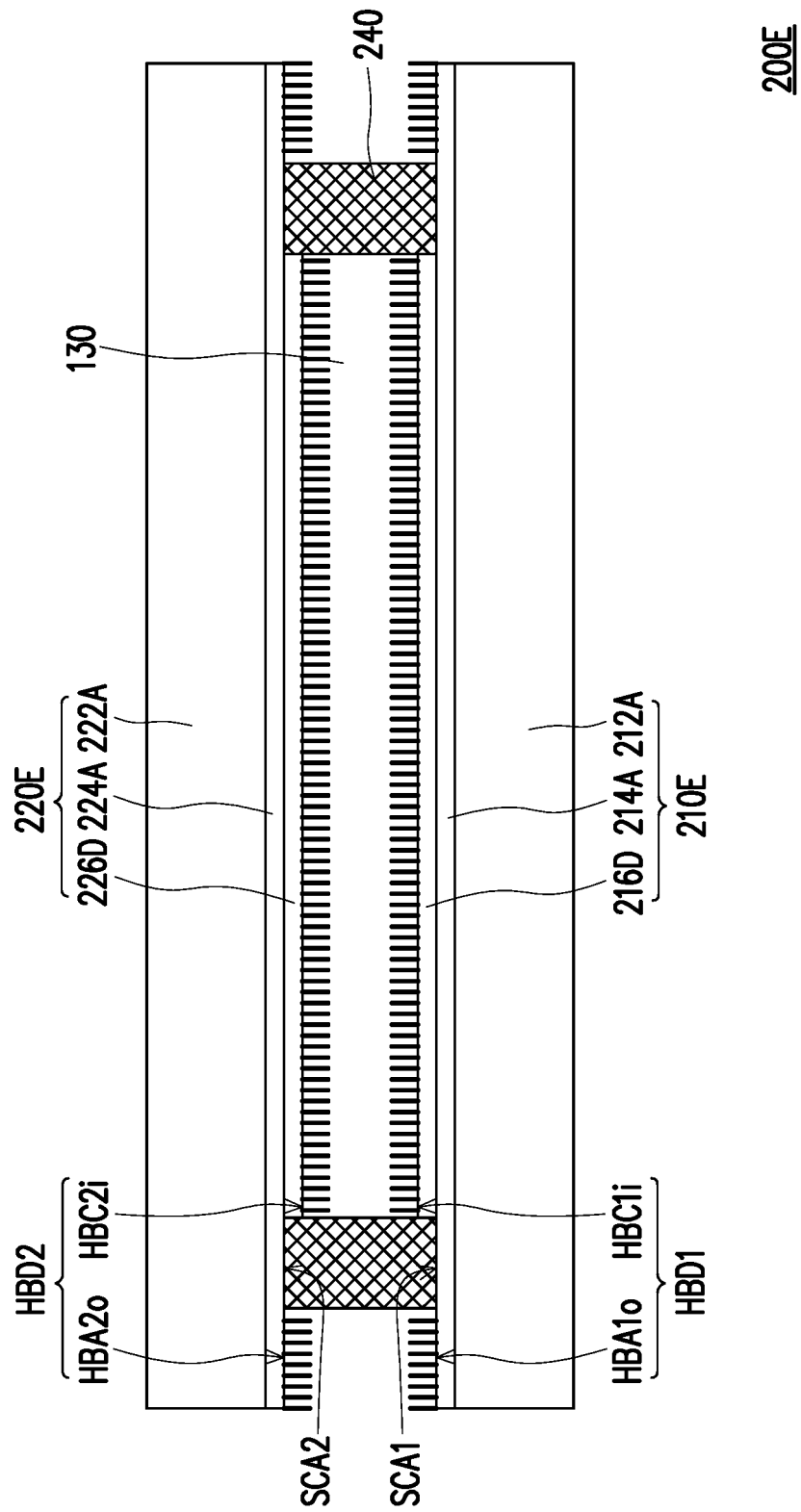
FIG. 11 schematically illustrates a cross sectional view of a display panel according to an embodiment of the disclosure.

FIG. 11 schematically illustrates a cross sectional view of a display panel according to an embodiment of the disclosure. Referring to FIG. 11, a display panel 200E mainly includes a first substrate 210E, a second substrate 220E, a display medium layer 130 and a sealant 240. The display panel 200E is similar to the display panel 200D depicted in FIG. 10 and a difference between the two embodiments includes the structures of the first substrate 210E and the second substrate 220E. Therefore, the same or similar components in the two embodiments are indicated by the same or similar reference numbers and the details of these components in the embodiment may refer to the embodiment depicted in FIG. 10. In the present embodiment, a hydrophobic surface HBD1 and a sealant-contacting surface SCA1 is formed on the first substrate 210E and a hydrophobic surface HBD2 and a sealant-contacting surface SCA2 is formed on the second substrate 220E.

In the embodiment, the first substrate 210E includes a support plate 212A, a transistor array layer 214A, and an alignment layer 216D. The structure and the material of the support plate 212A and the transistor array layer 214A may refer to the above descriptions and are not reiterated here. In the embodiment, the alignment layer 216D is an inorganic alignment layer and extends within the region surrounded by the sealant 240 without overlapping the sealant 240. Specifically, the alignment layer 216D reaches and is in contact with the inner edge of the sealant 240. The hydrophobic surface HBD1 includes an inner portion HBC1$i$ of the hydrophobic surface HBD1 defined by the alignment layer 216D. In addition, the uppermost film layer of the transistor array layer 212A defines the outer portion HBA1$o$ of the hydrophobic surface HBD1 and the sealant-contacting surface SCA1 as the similar components depicted in FIG. 7. In other words, the sealant 240 is in contact with the uppermost film layer of the transistor array layer 212A at the sealant-contacting surface SCA1.

The second substrate 220E includes a support plate 222A, a conductive layer 224A, and an alignment layer 226D. The structure and the material of the support plate 222A and the conductive layer 224A may refer to the above descriptions and are not reiterated here. In the embodiment, the alignment layer 226D is an inorganic alignment layer and extends within the region surrounded by the sealant 240 without overlapping the sealant 240. Specifically, the alignment layer 226D reaches and is in contact with the inner edge of the sealant 240. The hydrophobic surface HBD2 includes an inner portion HBC2$i$ defined by the alignment layer 226D. In addition, the conductive layer 224A defines the outer portion HBA2$o$ of the hydrophobic surface HBD2 and the sealant-contacting surface SCA2 as the similar components depicted in FIG. 7. In other words, the sealant 240 is in contact with the conductive layer 224A at the sealant-contacting surface SCA2.

The hydrophobic surfaces HBD1 and HBD2 and the sealant-contacting surfaces SCA1 and SCA2 provide similar function to the above hydrophobic surfaces and the sealant-contacting surfaces in FIGS. 7 to 10. Accordingly, the shape of the sealant 240 may have the specific geometry based on the distribution of the hydrophobic surfaces HBD1 and HBD2, and have a sharp edge with good linearity. For example, the sealant 240 may have the shape shown in any of the sealants 140A to 140E and their alternatives described in above.

Figure 12:
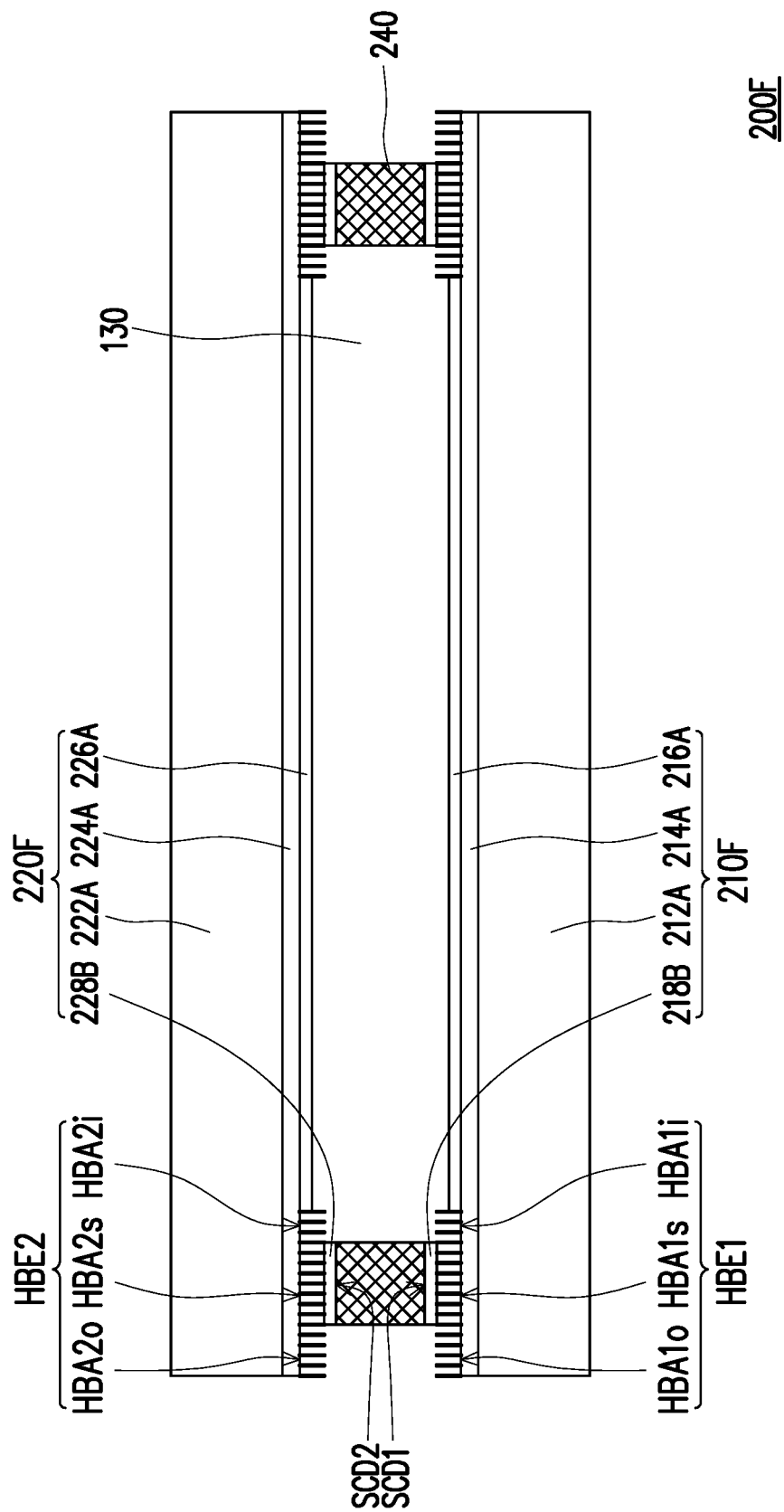
FIG. 12 schematically illustrates a cross sectional view of a display panel according to an embodiment of the disclosure.

FIG. 12 schematically illustrates a cross sectional view of a display panel according to an embodiment of the disclosure. Referring to FIG. 12, a display panel 200F mainly includes a first substrate 210F, a second substrate 220F, a display medium layer 130 and a sealant 240. The first substrate 210F and the second substrate 220F are assembled via the sealant 240, and the display medium layer 130 is disposed between the first substrate 210F and the second substrate 220F and surrounded by the sealant 240. Specifically, a hydrophobic surface HBE1 and a sealant-contacting surface SCD1 are formed on the first substrate 210F and face the display medium layer 130, and a hydrophobic surface HBE2 and a sealant-contacting surface SCD2 are formed on the second substrate 220F and face the display medium layer 130. In the embodiment, the sealant-contacting surface SCD1 on the first substrate 210F and the sealant-contacting surface SCD2 on the second substrate 220F are aligned with each other. The sealant-contacting surface SCD1 is less hydrophobic than the hydrophobic surface HBE1 and the sealant-contacting surface SCD2 is less hydrophobic than the hydrophobic surface HBE2. Specifically, one end of the sealant 240 is in contact with the sealant-contacting surfaces SCD1 and is substantially demarked by the boundaries between the hydrophobic surface HBE1 and the sealant-contacting surface SCD1. The other end of the sealant 240 is in contact with hydrophobic surface HBE2 and the sealant-contacting surface SCD2. In an alternative embodiment, one of the group of the hydrophobic surface HBE1 and the sealant-contacting surface SCD1 and the group of the hydrophobic surface HBE2 and the sealant-contacting surface SCD2 may be omitted.

The first substrate 210F, similar to the first substrate 210A in FIG. 7, includes a support plate 212A, a transistor array layer 214A, and an alignment layer 216A and further includes an inorganic layer 218B. The structure and the material of the support plate 212A, the transistor array layer 214A, and the alignment layer 216A may refer to the above descriptions and are not reiterated here. In the embodiment, the portion of the uppermost film layer of the transistor array layer 214A extending from the edge of the alignment layer 216A to the edge of the support plate 212A is entirely subjected to a hydrophobic treatment. Accordingly, the entire surface of the portion of the uppermost film layer of the transistor array layer 214A extending from the edge of the alignment layer 216A to the edge of the support plate 212A may present hydrophobic property and form the hydrophobic surface HBE1. The inorganic layer 218B is formed on the uppermost film layer of the transistor array layer 214A and defines the sealant-contacting surface SCD1. Specifically, the inorganic layer 218B divides the hydrophobic surface HBE1 into an inner portion HBA1$i$ extending between the inorganic layer 218B and the alignment layer 216A, an outer portion HBA1$o$ extending between the inorganic layer 218B and the edge of the support plate 212A and an intermediate portion HBA1$s$ extending between the inner portion HBA1$i$ and the outer portion HBA1$o$. Particularly, the intermediate portion HBA1$s$ overlaps the inorganic layer 218B. The inorganic layer 218B provides the sealant-contacting surface SCD1 being less hydrophobic than the inner portion HBA1$i$ and the outer portion HBA1$o$ of the hydrophobic surface HBE1.

The second substrate 220E, similar to the second substrate 220A in FIG. 7, includes a support plate 222A, a conductive layer 224A, and an alignment layer 226A and further includes an inorganic layer 228B. The structure and the material of the support plate 222A, the conductive layer 224A, and the alignment layer 226A may refer to the above descriptions and are not reiterated here. In the embodiment, the portion of the conductive layer 224A extending from the edge of the alignment layer 226A to the edge of the support plate 222A is entirely subjected to a hydrophobic treatment. Accordingly, the entire surface of the portion of the conductive layer 224A extending from the edge of the alignment layer 226A to the edge of the support plate 222A may present hydrophobic property and form the hydrophobic surface HBE2. The inorganic layer 228B is formed on the conductive layer 224A and defines the sealant-contacting surface SCD2. Specifically, the inorganic layer 228B divides the hydrophobic surface HBE2 into an inner portion HBA2$i$ extending between the inorganic layer 228B and the alignment layer 226A, an outer portion HBA2$o$ extending between the inorganic layer 228A and the edge of the support plate 222A and an intermediate portion HBA2$s$ extending between the inner portion HBA2$i$ and the outer portion HBA2$o$. Particularly, the intermediate portion HBA2$s$ overlaps the inorganic layer 228B. The inorganic layer 228B provides the sealant-contacting surface SCD2 being less hydrophobic than the inner portion HBA2$i$ and the outer portion HBA2$o$ of the hydrophobic surface HBE2.

Two ends of the sealant 240 are respectively in contact with the sealant-contacting surface SCD1 on the inorganic layer 218B and the sealant-contacting surface SCD2 on the inorganic layer 228B. The hydrophobic surfaces HBE1 and HBE2 and the sealant-contacting surfaces SCD1 and SCD2 provide similar function to the above hydrophobic surfaces and the sealant-contacting surfaces in FIGS. 7 to 11. Accordingly, the shape of the sealant 240 may have specific geometry based on the distribution of the hydrophobic surfaces HBE1 and HBE2 and the sealant-contacting surfaces SCD1 and SCD2 and have a sharp edge with good linearity. For example, the sealant 240 may have the shape shown in any of the sealants 140A to 140E and their alternatives described in above.

Figure 13:
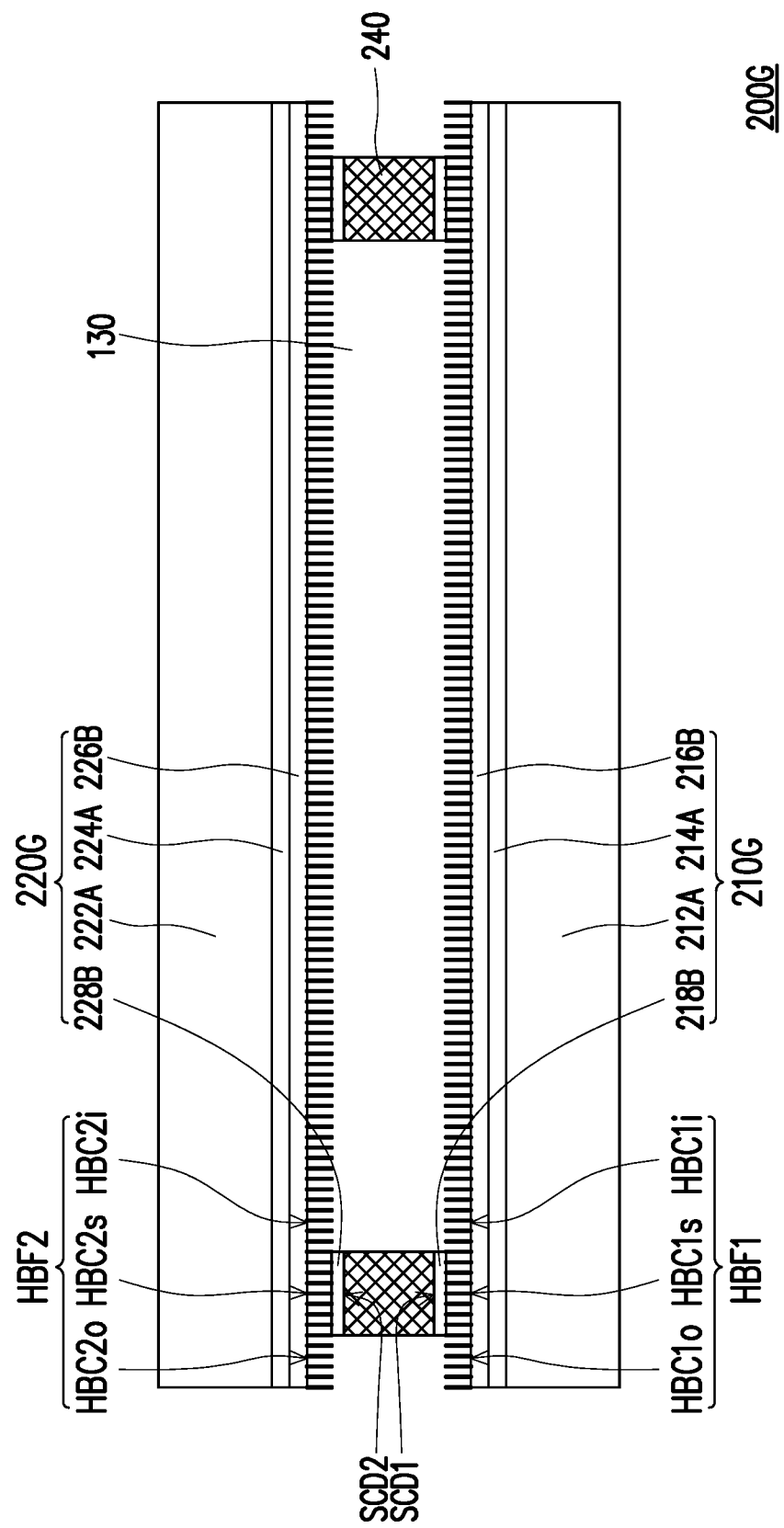
FIG. 13 schematically illustrates a cross sectional view of a display panel according to an embodiment of the disclosure.

FIG. 13 schematically illustrates a cross sectional view of a display panel according to an embodiment of the disclosure. Referring to FIG. 13, a display panel 200G mainly includes a first substrate 210G, a second substrate 220G, a display medium layer 130 and a sealant 240. The first substrate 210G and the second substrate 220G are assembled via the sealant 240, and the display medium layer 130 is disposed between the first substrate 210G and the second substrate 220G and surrounded by the sealant 240. Specifically, a hydrophobic surface HBF1 and a sealant-contacting surface SCD1 are formed on the first substrate 210G and face the display medium layer 130, and a hydrophobic surface HBF2 and a sealant-contacting surface SCD2 are formed on the second substrate 220G and face the display medium layer 130. In the embodiment, the sealant-contacting surface SCD1 on the first substrate 210G and the sealant-contacting surface SCD2 on the second substrate 220G are aligned with each other. The sealant-contacting surface SCD1 is less hydrophobic than the hydrophobic surface HBF1 and the sealant-contacting surface SCD2 is less hydrophobic than the hydrophobic surface HBF2. Specifically, one end of the sealant 240 is in contact with the sealant-contacting surfaces SCD1 and is substantially demarked by the boundaries between the hydrophobic surface HBF1 and the sealant-contacting surface SCD1. The other end of the sealant 240 is in contact with the sealant-contacting surface SCD2 and is substantially demarked by the boundaries between the hydrophobic surface HBF2 and the sealant-contacting surface SCD2. In an alternative embodiment, one of the group of the hydrophobic surface HBF1 and the sealant-contacting surface SCD1 and the group of the hydrophobic surface HBF2 and the sealant-contacting surface SCD2 may be omitted.

The first substrate 210G, similar to the first substrate 210C in FIG. 9, includes a support plate 212A, a transistor array layer 214A, and an alignment layer 216B and further includes an inorganic layer 218B. The structure and the material of the support plate 212A, the transistor array layer 214A and the alignment layer 216B may refer to the above descriptions and are not reiterated here. In the embodiment, the alignment layer 216B extending thorough the entire surface of the support plate 212A is an inorganic alignment layer and entirely subjected to a hydrophobic treatment. Accordingly, the entire surface of the alignment layer 216B may present hydrophobic property and form the hydrophobic surface HBF1. The inorganic layer 218B is formed on the alignment layer 216B and defines the sealant-contacting surface SCD1. Specifically, the inorganic layer 218B divides the hydrophobic surface HBF1 into an inner portion HBC1$i$ extending within the region surrounded by the sealant 240, an outer portion HBC1$o$ extending between the inorganic layer 218A and the edge of the support plate 212A and an intermediate portion HBC1$s$ extending between the inner portion HBC1$i$ and the outer portion HBC1$o$. Particularly, the intermediate portion HBC1$s$ overlaps the inorganic layer 218B. The inorganic layer 218B provides the sealant-contacting surface SCD1 being less hydrophobic than the inner portion HBC1*i* and the outer portion HBC1*o* of the hydrophobic surface HBF1.

The second substrate 220G, similar to the second substrate 220C in FIG. 9, includes a support plate 222A, a conductive layer 224A, and an alignment layer 226B and further includes an inorganic layer 218B. The structure and the material of the support plate 222A, the conductive layer 224A and the alignment layer 226B may refer to the above descriptions and are not reiterated here. In the embodiment, the alignment layer 226B extending thorough the entire surface of the support plate 222A is an inorganic alignment layer and entirely subjected to a hydrophobic treatment. Accordingly, the entire surface of the alignment layer 226B may present hydrophobic property and form the hydrophobic surface HBF2. The inorganic layer 228B is formed on the alignment layer 226B and defines the sealant-contacting surface SCD2. Specifically, the inorganic layer 228B divides the hydrophobic surface HBF1 into an inner portion HBC2*i* extending within the region surrounded by the sealant 240, an outer portion HBC2*o* extending between the inorganic layer 228A and the edge of the support plate 222A and an intermediate portion HBC2*s* extending between the inner portion HBC2*i* and the outer portion HBC2*o*. Particularly, the intermediate portion HBC1*s* overlaps the inorganic layer 228B. The inorganic layer 228B provides the sealant-contacting surface SCD2 being less hydrophobic than the inner portion HBC2*i* and the outer portion HBC2*o* of the hydrophobic surface HBF2.

Two ends of the sealant 240 are respectively in contact with the sealant-contacting surface SCD1 on the inorganic layer 218B and the sealant-contacting surface SCD2 on the inorganic layer 228B. The hydrophobic surfaces HBF1 and HBF2 and the sealant-contacting surfaces SCD1 and SCD2 provide similar function to the above hydrophobic surfaces and the sealant-contacting surfaces in FIGS. 7 to 12. Accordingly, the shape of the sealant 240 may have specific geometry based on the distribution of the hydrophobic surfaces HBF1 and HBF2, and have a sharp edge with good linearity. For example, the sealant 240 may have the shape shown in any of the sealants 140A to 140E and their alternatives described in above.

Figure 14:
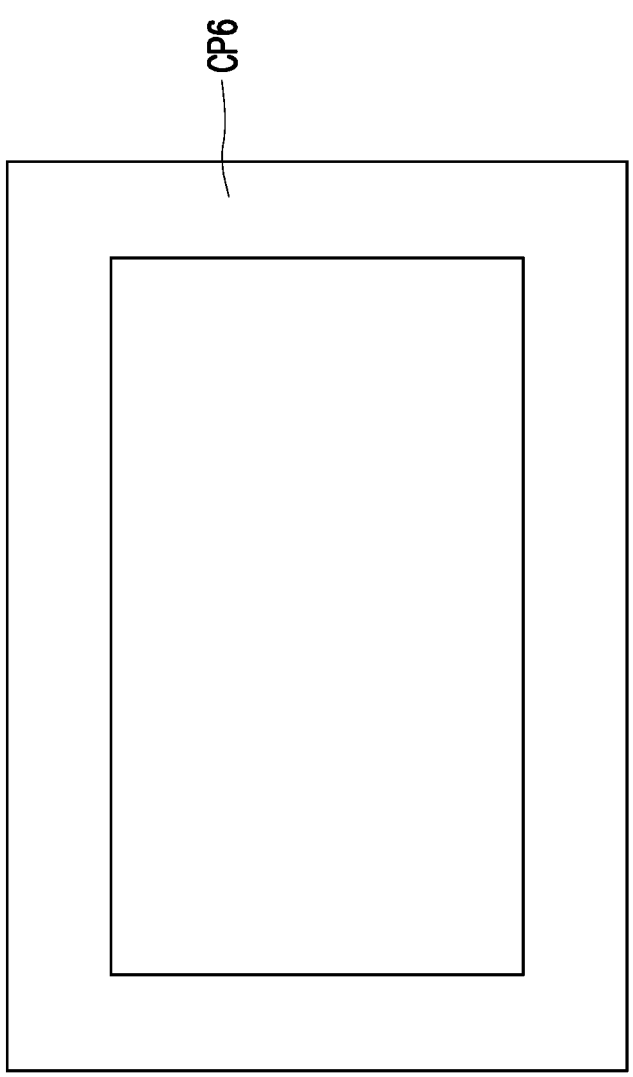
FIG. 14 schematically illustrates a top view of a sealant in a display panel according to an embodiment of the disclosure.
Figure 15:
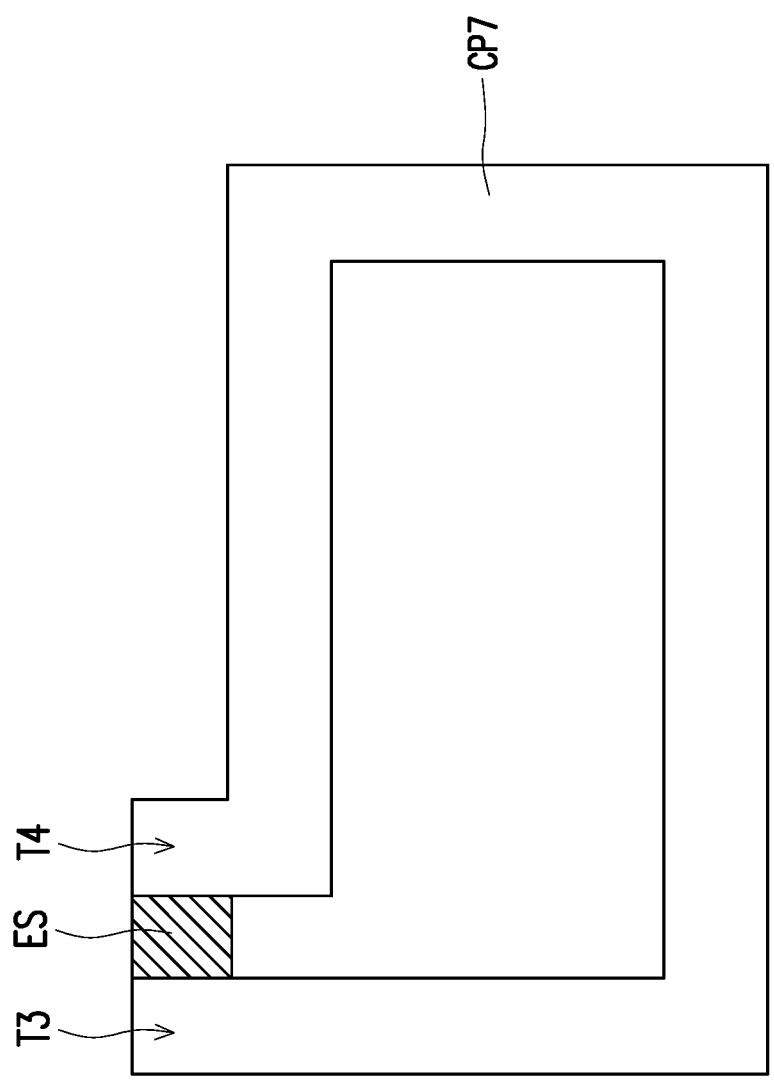
FIG. 15 schematically illustrates a top view of a sealant in a display panel according to another embodiment of the disclosure.

Any of the display panels 200A to 200G may further includes a color filter layer or other function layer that is disposed between the transistor array layer and the alignment layer on the first substrate. In addition, the sealant 240 in the display panels 200A to 200G may have alternative top view shapes. FIG. 14 schematically illustrates a top view of a sealant in a display panel according to an embodiment of the disclosure. Referring to FIG. 14, a sealant 340A may include a continuous one-piece pattern CP6 with a substantially identical width and the continuous one-piece pattern CP6 forms a closed ring shape. The sealant 240 in the above display panels 200A to 200G each of which includes a hydrophobic surface that demarks the boundary of a sealant-contacting surface may have the top view shape as the sealant 340A. In such case, the edge of the continuous one-piece pattern CP6 has good linearity without an obvious roughness. In addition, FIG. 15 schematically illustrates a top view of a sealant in a display panel according to another embodiment of the disclosure, in which the sealant 340B has a continuous one-piece pattern CP7 and an end seal ES. The continuous one-piece pattern CP7 has a substantially identical width and the continuous one-piece pattern CP7 has two terminals T3 and T4 separated by a distance and the end seal ES is disposed to connect the two terminals T3 and T4 so that the continuous one-piece pattern CP7 and the end seal ES together forms a closed ring. The sealant 240 in the above display panels 200A to 200G each of which includes a hydrophobic surface that demarks the boundary of a sealant-contacting surface may have the top view shape as the sealant 340B. In such case, the edge of the continuous one-piece pattern CP7 has good linearity without an obvious roughness.

In light of the foregoing, the display panel in accordance with some embodiments of the disclosure includes the sealant having various widths. The pattern of the sealant involves more flexible design window by utilizing an APR printing, utilizing a screen printing or forming the hydrophobic surface around the sealant contacting surface. In addition, at the portion of the sealant with a smaller width, a conductor may be disposed, which improves the efficiency of the spacing utility of the display panel. In other words, the size of the display panel may be more compact by disposing the conductor at least partially within the recess on the outer edge of the sealant. In some embodiments of the disclosure, the display panel has a hydrophobic surface that demarks the boundary of a sealant-contacting surface, which facilitates to ensure the shape of the sealant and improve the linearity of the edge of the sealant shape.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display panel comprising:
   a first substrate;
   a second substrate assembled with the first substrate;
   a display medium layer disposed between the first substrate and the second substrate;
   a hydrophobic surface disposed on at least one of the first substrate and the second substrate, facing the display medium layer;
   a sealant-contacting surface disposed on the at least one of the first substrate and the second substrate, and being less hydrophobic than the hydrophobic surface, wherein the hydrophobic surface comprises an inner portion and an outer portion sandwiching the sealant-contacting surface;
   a sealant disposed between the first substrate and the second substrate, and extending within the sealant-contacting surface;
   an alignment layer disposed on the at least one of the first substrate and the second substrate and surrounded by the sealant, wherein the inner portion is defined by the alignment layer and an orthographic projection of the outer portion on the first substrate does not overlap with an orthographic projection of the alignment layer on the first substrate; and
   a conductive layer disposed on the at least one of the first substrate and the second substrate and extended across the sealant to define the outer portion of the hydrophobic surface.

2. The display panel according to claim 1, wherein the alignment layer is spaced from the sealant by a gap, and the inner portion of the hydrophobic surface extends between the alignment layer and the sealant.

3. The display panel according to claim 2, wherein the alignment layer is made of an organic alignment material.

4. The display panel according to claim 1, wherein the alignment layer extends to be in contact with the sealant, and the alignment layer is subjected to a hydrophobic treatment to form the inner portion of the hydrophobic surface.

5. The display panel according to claim 4, wherein the alignment layer is made of an inorganic alignment material.

6. The display panel according to claim 4, wherein the alignment layer further extends to overlap the sealant.

7. The display panel according to claim 6, further comprises an inorganic layer disposed between the sealant and the alignment layer, wherein a surface of the inorganic layer forms the sealant-contacting surface.

* * * * *